United States Patent
Sakai et al.

(10) Patent No.: US 9,348,176 B2
(45) Date of Patent: May 24, 2016

(54) LIQUID CRYSTAL DISPLAY DEVICE

(71) Applicant: Sharp Kabushiki Kaisha, Osaka-shi, Osaka (JP)

(72) Inventors: Akira Sakai, Osaka (JP); Masahiro Hasegawa, Osaka (JP); Hidefumi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/420,704

(22) PCT Filed: Aug. 21, 2013

(86) PCT No.: PCT/JP2013/072252
§ 371 (c)(1),
(2) Date: Feb. 10, 2015

(87) PCT Pub. No.: WO2014/034481
PCT Pub. Date: Mar. 6, 2014

(65) Prior Publication Data
US 2015/0205157 A1    Jul. 23, 2015

(30) Foreign Application Priority Data
Aug. 27, 2012   (JP) .................. 2012-186524

(51) Int. Cl.
G02F 1/133     (2006.01)
G02F 1/1335    (2006.01)
G02F 1/13363   (2006.01)

(52) U.S. Cl.
CPC ........ G02F 1/13362 (2013.01); G02F 1/13363 (2013.01); G02F 1/133606 (2013.01)

(58) Field of Classification Search
CPC ........... G02F 1/13362; G02F 1/13363; G02F 1/133606
See application file for complete search history.

(56) References Cited

U.S. PATENT DOCUMENTS

| 6,295,108 B1* | 9/2001 | Kaneko ............. G02F 1/133516 349/115 |
| 2010/0165660 A1* | 7/2010 | Weber ................... G02B 5/305 362/609 |
| 2010/0283940 A1 | 11/2010 | Takemoto et al. |
| 2013/0057806 A1* | 3/2013 | Kanemitsu ........ G02F 1/133603 349/64 |
| 2014/0049734 A1* | 2/2014 | Erinjippurath ....... G09G 3/3611 349/96 |

FOREIGN PATENT DOCUMENTS

| JP | 2561483 B2 | 12/1996 |
| JP | 2009-265124 A | 11/2009 |
| JP | 2010-015038 A | 1/2010 |

* cited by examiner

*Primary Examiner* — James Dudek
(74) *Attorney, Agent, or Firm* — Keating & Bennett, LLP

(57) ABSTRACT

The present invention provides a liquid crystal display device that is excellent in production efficiency, achieves a high CR, and significantly improves the viewing angle characteristics (reduces the gamma shift), while suppressing an image blur. The present invention provides a liquid crystal display device at least including: an anisotropic collimating backlight; a lower polarizing plate; a liquid crystal panel; an upper polarizing plate; and an anisotropic diffusion element, the anisotropic collimating backlight having a light distribution anisotropy of a specific angle being combined with the anisotropic diffusion element having a diffusion anisotropy of a specific angle.

16 Claims, 11 Drawing Sheets

LIQUID CRYSTAL DISPLAY DEVICE

TECHNICAL FIELD

The present invention relates to a liquid crystal display device. More specifically, the present invention relates to a liquid crystal display device including a liquid crystal panel, a polarizer, a birefringent layer, and a diffusion layer.

BACKGROUND ART

A liquid crystal display device commonly includes, in addition to a liquid crystal panel and a backlight (hereafter, also referred to as a BL), an optical element such as polarizing plates and retardation films. Liquid crystal display devices are widely used for electronic devices, such as monitors, projectors, mobile phones, and personal digital assistants (PDA) because of their excellent display properties. The use of light condensing elements is a known technique for controlling the viewing angle of a display such as liquid crystal display devices.

Specifically, a disclosed liquid crystal display device includes at least a first polarizer, a liquid crystal cell including a liquid crystal layer between a first substrate and a second substrate, an optical compensation element, a second polarizer, and a light collection backlight in the stated order from the view side (see Patent Literature 1).

Also disclosed are a light condensing sheet including an absorptive linear polarizing layer, a negative birefringent layer, and a reflective linear polarizing layer, and a light control film including a sandwich structure including a birefringent film between polarizing films (see Patent Literatures 2 and 3).

CITATION LIST

Patent Literature

Patent Literature 1: JP-A 2010-15038
Patent Literature 2: JP-A 2009-265124
Patent Literature 3: Japanese Patent No. 2561483

SUMMARY OF INVENTION

Technical Problem

Liquid crystal display devices have problems of leakage of light in black display and a low contrast ratio (hereafter, also referred to as "CR", and unless otherwise specified, the "CR" means a CR in a normal direction relative to the substrate surface of the liquid crystal panel) caused by the leakage of light. A single liquid crystal panel made into a product has a CR (hereafter, also referred to as "native CR") of 3000 to 5000.

In contrast, a dimming backlight is known which dynamically controls the backlight luminance in accordance with the contrast of images to improve the CR (hereafter also referred to as "dynamic CR") of a liquid crystal display device. A liquid crystal display device having a dynamic CR of not less than 10000 is known.

The CR improvement by a dimming backlight is still not sufficient in that the effect is limited or not at all exerted for some kinds of images. For example, in a case where jet-black and pure white are both present in the same frame (e.g., images of a starry sky, subtitles on a cinema screen, black and white checkerboard patterns), the backlight luminance cannot be lowered for the purpose of avoiding impairment of whiteness in white display. Such a problem can be somewhat solved by the use of a local dimming backlight that includes a plurality of blocks in each of which the luminance is independently controlled and performs dimming in each block separately. Inside the block, however, the luminance cannot be controlled independently, and therefore the effect is still limited. Moreover, the use of a dimming backlight problematically increases the cost. In such a state of the art, the native CR of a liquid crystal panel is desired to be improved.

In this regard, Patent Literature 1 discloses a condensing/diffusing type liquid crystal display in which a collimating backlight having a half-luminance angle of 3° to 30° reduces the amount of light obliquely incident on a liquid crystal panel to reduce leakage of light in a normal direction, which improves the CR, and a diffusion element provided on the view side of a view-side polarizer distributes light in a front direction to an oblique direction to enlarge the viewing angle (e.g., disclosed is a structure including a BL emitting light at a narrow luminance half value width and a diffusion element).

The liquid crystal display device disclosed in Patent Literature 1 aims to reduce the half-luminance angle at all the azimuth angles (i.e., to isotropically collimate) as mentioned in the paragraph [0030], and therefore aside effect of lowering the luminance in an oblique direction occurs as mentioned in the paragraph [0047]. To compensate the lowering, a diffusion element needs to be provided. That is, the light once collimated needs to be again diffused for improvement of the viewing angle characteristics. A system therefor is complicated and not economical, and therefore is desired to be improved. Moreover, isotropic diffusion of collimated light is technically difficult. Before that, isotropic collimation of light is technically difficult. Employment of the techniques increases the cost. If the diffusion degree of the diffusion element is increased for the purpose of ensuring the luminance in an oblique direction, another problem of severe blurring of images arises.

The light condensing sheet disclosed in Patent Literature 2 and the light control film disclosed in Patent Literature 3 each includes a birefringent layer and a polarizer arranged in a manner not as to be orthogonal to or in parallel with each other but as to form an angle of 45° or 135°, for the purpose of performing isotropic collimation for lowering the transmittance at the oblique viewing angles in the entire azimuth. Accordingly, the light condensing sheet disclosed in Patent Literature 2 and the light control film disclosed in Patent Literature 3, as well as the liquid crystal display device disclosed in Patent Literature 1, are desired to be improved.

Examples of conventionally known light condensing elements include lenses and microblind films. Such light condensing elements, however, are hardly applied to large liquid crystal display devices. Moreover, thinning of liquid crystal display devices becomes problematically difficult.

In a liquid crystal display device of the vertical alignment (VA) mode, the viewing angle is problematically narrow, and especially problematically, a phenomenon that the gamma characteristic when a screen is seen in an oblique direction is significantly changed from the gamma characteristic when a screen is seen in a front direction (hereafter, such phenomenon is also referred to as the gamma shift) occurs. The gamma shift causes a problem that the images normally seen in a front direction is changed to abnormal and strange images when seen in an oblique direction.

None of Patent Literatures 1 to 3 discloses a method of reducing the gamma shift to solve the above problem. As a result of the studies by the present inventors, the configuration disclosed in Patent Literature 1, for example, may possibly reduce the gamma shift as light in the front direction in which the gamma characteristic is favorable is re-distributed in various directions. However, what is mentioned in the paragraph [0010] is still a problem to be solved.

The present invention devised in consideration of the state of the art aims to provide a liquid crystal display device that is excellent in production efficiency, achieves a high CR, and significantly improves the viewing angle characteristics (reduces the gamma shift), while suppressing an image blur.

Solution to Problem

The present inventors studied about factors of lowering of the CR in liquid crystal display devices to find out that the factors are (1) leakage of light due to an imperfect performance of a polarizing plate and (2) leakage of light due to light scattering inside a liquid crystal panel. It is to be noted that the CR of a liquid crystal panel is 3000 to 5000 mainly because of the factor (2) as a typical polarizing plate used in current liquid crystal panels has a CR of 10000 to 30000.

A description is given on the factor (2) leakage of light due to light scattering inside a liquid crystal panel. First, light obliquely incident on the liquid crystal panel is modulated to elliptically polarized light by a birefringent layer or a liquid crystal layer. Then, the light traveling direction is changed to a normal direction due to scattering (the polarization state is hardly changed before and after the scattering). The elliptically polarized light reaches the polarizing plate as it is and passes therethrough, so that leakage of light is observed in accordance with the ellipticity.

The leakage of light due to light scattering is caused as follows: light obliquely incident on the liquid crystal panel changes its traveling direction to a normal direction by internal scattering to be leaked from a polarizing plate on the screen side. In consideration of this, the CR can be improved by limiting the amount of light obliquely incident on the liquid crystal panel. The present inventors intensively studied about the relation between the leakage of light and oblique incident light to find out that leakage of light due to internal scattering of the panel, which lowers the CR of the liquid crystal panel, is remarkable when light is obliquely incident at a specific azimuth. Based on this fact, the present inventors found out that a collimating backlight that limits the incidence at the specific azimuth can improve the CR. The present inventors arranged a polarizer on the rear side of a rear-side polarizer of the liquid crystal panel in such a manner that the two polarizers are arranged in a parallel Nicol state. Between the two polarizers, a birefringent layer is arranged. This configuration enables not isotropic collimation that limits light emitted in an oblique direction in the entire azimuth but anisotropic collimation that limits light incident in an oblique direction at a specific azimuth where leakage of light is significant. As a result, leakage of light due to internal scattering of the liquid crystal panel is effectively suppressed and the CR is improved. In addition, highly productive polarizing films or retardation films can be used. The present inventors found out that these effects solve the above problems, thereby completing the present invention.

The present inventors have studied about the cause of a gamma shift in the VA-mode liquid crystal display device to find out that, in the VA mode wherein the halftone display is performed in a state where liquid crystal molecules are tilt relative to the normal direction of the substrate, the cause is a difference in retardation of a liquid crystal panel (liquid crystal layer) between a case where the liquid crystal panel is seen in the front direction and a case where the liquid crystal panel is seen in an oblique direction.

A description is given on a gamma shift in the VA-mode liquid crystal display device with reference to FIG. 15. FIG. 15 is a characteristic chart of a gamma shift in a VA-mode liquid crystal display device. A curve in the front direction is adjusted to gamma=2.2. The other four curves are curves of an azimuth angle $\phi$ at a polar angle $\theta=60°$. The azimuth angle $\phi$ is defined as a counterclockwise angle relative to a predetermined direction set to 0° in a display surface of a liquid crystal display device. Here, the curve in the front direction does not overlap with curves at the azimuth angles $\phi=0°$, 45°, 90°, and 135°. The curves at the azimuth angles $\phi=0°$, 45°, 90°, and 135° are shifted in a higher luminance direction compared to the curve in the front direction at many gray levels. This is a phenomenon called a gamma shift or white tinge. This phenomenon causes a problem that an image normally seen in the front direction is changed to an abnormal and strange image when seen in an oblique direction. In the present invention, the shift amount from the curve in the front direction to another curve at gray level 128 is conveniently determined as the gamma shift amount.

FIG. 15 shows that the gamma shift amounts at the azimuth angles $\phi=45°$ and 135° are greater than the gamma shift amounts at the azimuth angles $\phi=0°$ and 90°. Here, the view direction of a liquid crystal display device is divided into three directions including a front direction, a cross direction (at the azimuth angles $\phi=0°$, 90°, 180°, and 270°, and an oblique direction), and an X direction (at the azimuth angles $\phi=45°$, 135°, 225°, and 315°, and an oblique direction). In such a case, directions requiring improvement in the gamma characteristic are the cross direction and the X direction. Especially, the improvement in the X direction is more important. No improvement is needed in the front direction, and the improvement in the cross direction is less important than that in the X direction.

In consideration of the above fact, the present inventors have come up with the configuration illustrated in FIG. 16. First, an anisotropic collimating backlight in which the emission light amounts in the front direction and the cross direction are relatively larger than the emission light amount in the X direction (hereafter, also referred to as a cross-type anisotropic collimating backlight) is provided. This backlight gives deviation of the incident light amount on the liquid crystal panel. Specifically, the incident light amount is large in the front direction and the cross direction in which the gamma characteristic is favorable and the incident light amount is small in the X direction in which the gamma characteristic is comparatively poor. On the screen side of the liquid crystal panel, an isotropic diffusion element which has a higher diffusion degree in the X direction and a lower diffusion degree in the cross direction (hereafter, also referred to as an X-type anisotropic diffusion film) is provided. This film diffuses apart of a light component with a favorable gamma characteristic in the front direction and the cross direction, after passage through the liquid crystal panel, to the X direction. As a result, a favorable gamma characteristic is achieved in the X direction as well as in the front direction and the cross direction. Thus, the present inventors arrived at solving the above problems, thereby completing the present invention.

Since diffusion of light in the cross direction is not needed, such diffusion function is preferably not provided. This enables production of a liquid crystal display device which includes a structure including a diffusion film but hardly has a problem of an image blur. Commonly, pixels of a liquid crystal display device are formed to have a substantially longitudinal rectangle shape. In this case, the pixel pitch is shortest in the lateral direction (hereafter, also referred to as the cross direction), and the pixel pitches in the longitudinal direction and in the oblique direction)(45°) are longer than the pixel pitch in the lateral direction. Accordingly, an image blur caused by diffusion in the lateral direction is most remarkable. From this viewpoint, the above configuration that suppresses diffusion in the lateral direction (cross direction) can solve the problem of an image blur.

Not like a conventional collimating backlight that requires an optic lens, a light guide plate, and a reflector each including a complicated structure and also requires a physical distance, a simple anisotropic collimating backlight including a polarizing plate and a retardation film can be used in the present invention, which easily enables production of a large device at a low cost.

The above configuration is for a VA-mode liquid crystal display device. In the case of a TN-mode liquid crystal display device, the following configuration may be considered, in which the relation between the cross direction and the X direction is opposite to that in the VA mode.

In a TN-mode liquid crystal display device, directions requiring improvement in the gamma characteristic are the cross direction and the X direction. The improvement in the cross direction is more important. No improvement is needed in the front direction, and the improvement in the X direction is less important than that in the cross direction.

In a TN-mode liquid crystal display device, an anisotropic collimating backlight in which the emission light amounts in the front direction and the X direction are relatively larger than the emission light amount in the cross direction (hereafter, also referred to as an X-type anisotropic collimating backlight) is provided. This backlight gives deviation of the incident light amount on the liquid crystal panel. Specifically, the incident light amount is large in the front direction and the X direction in which the gamma characteristic is favorable and the incident light amount is small in the cross direction in which the gamma characteristic is comparatively poor. On the screen side of the liquid crystal panel, an isotropic diffusion element which has a higher diffusion degree in the cross direction and a lower diffusion degree in the X direction (hereafter, also referred to as a cross-type anisotropic diffusion film) is provided. This film diffuses a part of a light component with favorable gamma characteristic in the front direction and the X direction, after passage through the liquid crystal panel, to the cross direction. As a result, a favorable gamma characteristic is achieved in the cross direction as well as in the front direction and the X direction.

That is, one aspect of the present invention may be a liquid crystal display device at least including: an anisotropic collimating backlight; a lower polarizing plate; a liquid crystal panel; an upper polarizing plate; and an anisotropic diffusion element, the anisotropic collimating backlight including a backlight unit and an anisotropic collimating element, the anisotropic collimating element including a first polarizer and a birefringent layer, the lower polarizing plate including a second polarizer and a first birefringent layer, the upper polarizing plate including a second birefringent layer and a third polarizer, the anisotropic diffusion element including a first diffusion layer and a second diffusion layer, the backlight unit, the first polarizer, the birefringent layer, the second polarizer, the first birefringent layer, the liquid crystal panel, the second birefringent layer, the third polarizer, the first diffusion layer, and the second diffusion layer being laminated in the stated order, the anisotropic collimating backlight having a greater average luminance in a direction along an absorption axis of the second polarizer and an absorption axis of the third polarizer than in a direction across the absorption axis of the second polarizer and the absorption axis of the third polarizer, and the anisotropic diffusion element having a smaller diffusion degree in a direction along the absorption axis of the second polarizer and the absorption axis of the third polarizer than in a direction across the absorption axis of the second polarizer and the absorption axis of the third polarizer. The anisotropic collimating backlight, the lower polarizing plate, the liquid crystal panel, the upper polarizing plate, and the anisotropic diffusion element are commonly laminated in the stated order.

The configuration of the liquid crystal display device of the present invention is not especially limited as long as it essentially includes such components. The liquid crystal display device may or may not include other components.

Another preferred embodiment of the liquid crystal display device of the present invention is described in the following. Embodiments of the liquid crystal display device of the present invention may be employed in combination.

In the liquid crystal display device of the present invention, provided that an azimuth angle is determined as an counterclockwise angle relative to a predetermined direction set to 0° in a display surface of the liquid crystal display device, preferably, the anisotropic collimating backlight has a greater average luminance at the azimuth angles of substantially 0°, substantially 90°, substantially 180°, and substantially 270° than at the azimuth angles of substantially 45°, substantially 135°, substantially 225°, and substantially 315°; the anisotropic diffusion element has a smaller diffusion degree at the azimuth angles of substantially 0°, substantially 90°, substantially 180°, and substantially 270° than at the azimuth angles of substantially 45°, substantially 135°, substantially 225°, and substantially 315°; and one of the absorption axis of the second polarizer and the absorption axis of the third polarizer is at substantially 0°, and the other is at substantially 90°, or the anisotropic collimating backlight has a smaller average luminance at the azimuth angles of substantially 0°, substantially 90°, substantially 180°, and substantially 270° than at the azimuth angles of substantially 45°, substantially 135°, substantially 225°, and substantially 315°; the anisotropic diffusion element has a greater diffusion degree at the azimuth angles of substantially 0°, substantially 90°, substantially 180°, and substantially 270° than at the azimuth angles of substantially 45°, substantially 135°, substantially 225°, and substantially 315°; and one of the absorption axis of the second polarizer and the absorption axis of the third polarizer is at substantially 45°, and the other is at substantially 135°.

The anisotropic collimating backlight has a greater average luminance at the azimuth angles of substantially 0°, substantially 90°, substantially 180°, and substantially 270° than at the azimuth angles of substantially 45°, substantially 135°, substantially 225°, and substantially 315°. Such a state is referred to as a state where the light distribution anisotropy of the anisotropic collimating backlight is of a cross type. The anisotropic collimating backlight has a smaller average luminance at the azimuth angles of substantially 0°, substantially 90°, substantially 180°, and substantially 270° than at the azimuth angles of substantially 45°, substantially 135°, substantially 225°, and substantially 315°. Such a state is referred to as a state where the light distribution anisotropy of the anisotropic collimating backlight is of an X type.

The anisotropic diffusion element has a smaller diffusion degree at the azimuth angles of substantially 0°, substantially 90°, substantially 180°, and substantially 270° than at the azimuth angles of substantially 45°, substantially 135°, substantially 225°, and substantially 315°. Such a state is referred to as a state where a diffusion anisotropy of the anisotropic diffusion element is of an X type. The anisotropic diffusion element has a greater diffusion degree at the azimuth angles of substantially 0°, substantially 90°, substantially 180°, and substantially 270° than at the azimuth angles of substantially 45°, substantially 135°, substantially 225°, and substantially 315°. Such a state is referred to as a state where a diffusion anisotropy of the anisotropic diffusion element is of a cross type.

In one aspect of the present invention, the azimuth angle of substantially 0° refers to an angle preferably in a range of −10° to 10°. The azimuth angle of substantially 90° refers to an angle preferably in a range of 80° to 100°. The azimuth angle of substantially 180° refers to an angle preferably in a range of 170° to 190°. The azimuth angle of substantially 270° refers to an angle preferably in a range of 260° to 280°. The azimuth angle of substantially 45° refers to an angle preferably in a range of 35° to 55°. The azimuth angle of substantially 135° refers to an angle preferably in a range of 125° to 145°. The azimuth angle of substantially 225° refers to an angle preferably in a range of 215° to 235°. The azimuth angle of substantially 315° refers to an angle preferably in a range of 305° to 325°. The absorption axis of the second polarizer and the absorption axis of the third polarizer are each preferably at −10° to 10° when they are said to be at substantially 0°, preferably at 80° to 100° when they are said to be at substantially 90°, preferably at 35° to 55° when they are said to be at substantially 45°, and preferably at 125° to 145° when they are said to be at substantially 135°.

The luminance of the anisotropic collimating backlight is measured at a polar angle of greater than 0°.

The relation of the diffusion degrees of the anisotropic diffusion element is commonly determined in accordance with the level of the full width at half maximum (FWHM). Here, FWHM means the full width at half maximum of the luminance. The azimuth where the FWHM is largest is defined as a diffusion axis. It is to be noted the relation of the diffusion degrees may be determined in accordance with the level of the diffraction peaks in a case where the diffusion anisotropy is provided and the FWHM thereof are the same (e.g., in the case of an anisotropic diffusion element utilizing a diffraction phenomenon).

In the liquid crystal display device of the present invention, the predetermined direction in the display surface is preferably in parallel with a short side direction of a pixel in the liquid crystal panel. The short side refers to a short side of a substantial rectangle formed by long sides and short sides which defines a single pixel shape. With this configuration, a combination of the light distribution anisotropy of a later-described anisotropic collimating element (anisotropic collimating backlight) and the diffusion anisotropy of the anisotropic diffusion element can suppress an image blur caused by the diffusion element.

Next, a description is given on axial azimuths of components in the anisotropic collimating element and the lower polarizing plate. The absorption axis of the first polarizer and the absorption axis of the second polarizer are preferably in parallel with each other. The absorption axis of the second polarizer and an in-plane slow axis of the birefringent layer are preferably orthogonal to each other. This configuration enables anisotropic collimation in which incident light in an oblique direction at a specific azimuth where leakage of light is remarkable is limited. Accordingly, the incident light amount in a direction where the gamma characteristic is favorable can be increased, while the incident light amount in a direction where the gamma characteristic is comparatively poor can be decreased. For example, in the case of the VA-mode liquid crystal display device, the incident light amount can be increased in the front direction and the cross direction (directions at azimuth angles of 0°, 90°, 180°, and 270°) than in the X direction (directions at azimuth angles of 45°, 135°, 225°, and 315°).

In the liquid crystal display device of the present invention, the state where the absorption axis of the first polarizer and the absorption axis of the second polarizer are in parallel with each other is not necessarily a state where the absorption axis of the first polarizer and the absorption axis of the second polarizer are strictly in parallel with each other. Specifically, the angle formed between the two absorption axes is set to preferably −10° to 10° (more preferably −5° to 5°). If the angle is set outside the preferable range, the transmittance in the normal direction may be lowered.

Next, a description is given on axial azimuths of components in the anisotropic diffusion element. A diffusion axis of the first diffusion layer and a diffusion axis of the second diffusion layer are preferably orthogonal to each other. With this configuration, for example, in the VA-mode liquid crystal display device, the diffusion degree in the X direction can be increased and the diffusion degree in the cross direction can be reduced.

Next, a description is given on axial azimuths of components in the lower polarizing plate and the anisotropic diffusion element. An angle between the absorption axis of the second polarizer and a diffusion axis of the first diffusion layer and an angle between the absorption axis of the second polarizer and a diffusion axis of the second diffusion layer are individually preferably 45° or 135°. With this configuration, for example, in the VA-mode liquid crystal display device, a part of a light component with favorable gamma characteristic in the front direction and the cross direction, after passage through the liquid crystal panel, can be diffused to the X direction.

For example, in the case of the VA-mode liquid crystal display device, the light distribution anisotropy of the anisotropic collimating backlight is preferably of the cross type and the diffusion anisotropy of the anisotropic diffusion element is preferably of the X type. In the case of the TN-mode liquid crystal display device, in contrast, the light distribution anisotropy of the anisotropic collimating backlight is preferably of the X type and the diffusion anisotropy of the anisotropic diffusion element is preferably of the cross type.

In the liquid crystal display device of the present invention, preferably, the anisotropic collimating element includes a plurality of the birefringent layers, and the backlight unit, the first polarizer, the plurality of the birefringent layers, the second polarizer, the first birefringent layer, the liquid crystal panel, the second birefringent layer, the third polarizer, the first diffusion layer, and the second diffusion layer are laminated in the stated order. With this configuration, lamination of inexpensive birefringent layers can give a desired in-plane phase difference. In a case where the plurality of the birefringent layers has a slight in-plane anisotropy, the axial angles of the birefringent layers may be each independently determined as appropriate. In-plane slow axes of the plurality of the birefringent layers are preferably orthogonal to or in parallel with one another.

As described earlier, in a case where a polarizer (the first polarizer) is arranged on the rear side of a rear-side polarizer (the second polarizer) of the liquid crystal panel in such a manner that the two polarizers are arranged in a parallel Nicol state and the birefringent layer is provided between the two polarizers, anisotropic collimation is enabled in which incident light in an oblique direction at a specific azimuth where leakage of light is remarkable is suppressed. The present inventors found out the following features of the birefringent layer.

First, the birefringent layer preferably has a biaxial parameter NZ satisfying 10≤NZ or NZ≤−9 (namely, C-plate with a small in-plane phase difference), and the birefringent layer preferably has a thickness retardation value in an absolute value |Rth| satisfying |Rth|≥200 nm (hereafter, such a liquid crystal display device is also referred to as "a first liquid crystal display device of the present invention").

Second, the birefringent layer preferably has a biaxial parameter NZ satisfying 2≤NZ<10 or −9<NZ≤−1, and an angle between the absorption axis of the second polarizer and an in-plane slow axis of the birefringent layer is preferably neither 45° nor 135° (hereafter, such a liquid crystal display device is also referred to as "a second liquid crystal display device of the present invention").

The liquid crystal display device of the present invention exerts following effects. In the following, for the sake of convenience, a description is given on a case where the backlight is arranged to face the first polarizer and the absorption axes or reflection axes of the first polarizer and the second polarizer are set at substantially 90°. The effects of the present invention can be exerted in cases other than the above case.

First, a description is given on the first liquid crystal display device of the present invention. The birefringent layer hardly changes the polarization state, after passage through the first polarizer, of light incident in the normal direction, light incident in an oblique direction at an azimuth in parallel with the transmission axis, and light incident in an oblique direction at an azimuth in parallel with the absorption axis or the reflection axis. Accordingly, the measured transmittance of light is almost as high as the transmittance of light through the second polarizer and the first polarizer arranged in a parallel Nicol state. In contrast, since the birefringent layer changes the polarization state, after passage through the first polarizer, of light incident in other directions represented by an oblique direction at an azimuth angle of 45°, the measured transmittance is low.

Next, a description is given on the second liquid crystal display device of the present invention. The birefringent layer is less likely to change the polarization state, after passage through the first polarizer, of light incident in the normal direction, light incident in an oblique direction at an azimuth in parallel with the transmission axis, and light incident in an oblique direction at an azimuth in parallel with the absorption axis or the reflection axis. Accordingly, the measured transmittance is comparatively high. In contrast, since the birefringent layer changes the polarization state, after passage through the first polarizer, of light incident in other directions represented by an oblique direction at an azimuth angle of 45°, the measured transmittance is comparatively low.

As described above, the present invention enables collimation that selectively concentrate the distribution of light emitted from the backlight to the normal direction, the direction of the transmission axis, and the direction of the absorption axis or the reflection axis (cross-type light distribution). The leakage of light due to light scattering is especially remarkable with respect to the incident light in an oblique direction at an azimuth angle of 45°, and therefore, the anisotropic collimation of the present invention is sufficiently effective to reduce the leakage of light, improving the CR.

The first liquid crystal display device of the present invention exerts better effects of reducing leakage of light and improving the CR compared to the second liquid crystal display device of the present invention. In contrast, the second liquid crystal display device of the present invention is better in production efficiency than the first liquid crystal display device of the present invention as the already mass-produced biaxial film can be used.

In the first liquid crystal display device and the second liquid crystal display device of the present invention, the first polarizer, the birefringent layer, and the second polarizer may be laminated in the stated order from the backlight unit side or from the liquid crystal panel side.

In the first liquid crystal display device and the second liquid crystal display device of the present invention, an air layer may be provided in at least one space between the components. For example, an air layer may be provided at least one space of the spaces between the liquid crystal panel and the second polarizer, between the second polarizer and the birefringent layer, between the birefringent layer and the first polarizer, and between the first polarizer and the backlight unit.

In the following, a specific description is given on preferable embodiments of the first liquid crystal display device of the present invention and the second liquid crystal display device of the present invention.

At least one of the first polarizer and the second polarizer may be a reflective polarizer or a composite polarizer including a laminate of an absorptive polarizer and a reflective polarizer. This configuration reduces loss in light absorption by the absorptive polarizer and returns the reflected light to the backlight for recycle, enabling the effective use of light.

The first polarizer and the second polarizer may be individually an absorptive polarizer or a composite polarizer including a laminate of an absorptive polarizer and a reflective polarizer, and the first polarizer may have a single transmittance different from a single transmittance of the second polarizer. Commonly in an absorptive polarizer, the single transmittance and the contrast of the polarizer have a trade-off relation. Here, since the transmission axis of the first polarizer and the transmission axis of the second polarizer are in parallel with each other, the first polarizer and the second polarizer function to mutually complement the contrast of the other. With this configuration, even if the single transmittance of one of the first polarizer and the second polarizer is increased, lowering of the contrast of the polarizer is suppressed. As a result, in the entire system (e.g., liquid crystal display device) including the first polarizer and the second polarizer, the transmittance, namely, light use efficiency can be improved, while the contrast is maintained.

The single transmittance and the contrast of the composite polarizer as used herein refer to the single transmittance and the contrast of the absorptive polarizer alone in the composite polarizer, respectively.

The single transmittance (T1) of the first polarizer and the single transmittance (T2) of the second polarizer have a difference in the absolute value (ΔT1=|T1−T2|) of preferably 0.2 to 3.0%, and more preferably 0.5 to 2.0%. If the ΔT1 is less than 0.2%, the transmittance in the entire system may not be sufficiently improved. In contrast, if the ΔT1 is more than 3.0%, the contrast in the entire system may be lowered.

The contrast (CR1) of the first polarizer and the contrast (CR2) of the second polarizer are not particularly limited and may be determined as appropriate. As mentioned above, commonly in an absorptive polarizer, the single transmittance and the contrast of the polarizer have a trade-off relation. In a case where the contrast can be adjusted independently of the single transmittance, the CR1 and the CR2 are both preferably as high as possible.

In the first liquid crystal display device of the present invention, the first polarizer, the birefringent layer, and the second polarizer are laminated in the stated order. The first liquid crystal display device of the present invention may include a plurality of the birefringent layers. With this configuration, lamination of inexpensive birefringent layers can give a desired in-plane phase difference. In a case where the plurality of the birefringent layers has a slight in-plane anisotropy, the axial angles of the birefringent layers may be each independently determined as appropriate. In-plane slow axes of the plurality of the birefringent layers are preferably orthogonal to or in parallel with one another.

In the second liquid crystal display device of the present invention, the first polarizer, the birefringent layer, and the second polarizer are laminated in the stated order. Here, the second liquid crystal display device of the present invention may include a plurality of the birefringent layers, and in-plane slow axes of the plurality of the birefringent layers are preferably orthogonal to or in parallel with one another. With this configuration, lamination of inexpensive birefringent layers can give a desired in-plane phase difference.

In the liquid crystal display device of the present invention, a state where the in-plane slow axes of the plurality of the birefringent layers are orthogonal to or in parallel with one another is not necessarily limited to a state where an angle between the in-plane slow axes of the plurality of the birefringent layers is strictly 90° or 0°. The angle may be deviated from 90° or 0° to some degree. More specifically, the angle between the in-plane axes of the plurality of the birefringent layers is preferably set to 80° to 100° (more preferably 85° to 95°) or −10° to 10° (more preferably −5° to) 5°. If the angle is outside the preferable range, the transmittance in the normal direction and the oblique direction at an azimuth angle of 0° or 90° may be lowered.

In the second liquid crystal display device of the present invention, an angle between the absorption axis of the second polarizer and the in-plane slow axis of the birefringent layer is preferably 70° to 110° or −20° to 20°. More preferably, the absorption axis of the second polarizer and the in-plane slow axis of the birefringent layer are orthogonal to or in parallel with each other. Still more preferably, the absorption axis of the second polarizer and the in-plane slow axis of the birefringent layer are orthogonal to each other. This configuration can further lower the transmittance of light incident in other directions represented by an oblique direction at an azimuth angle of 45°, without impairing the transmittance of light incident in the normal direction, an oblique direction at an azimuth angle of 0°, and an oblique direction at an azimuth angle of 90°.

In the liquid crystal display device of the present invention, the state where the transmission axis of the second polarizer and the in-plane slow axis of the birefringent layer are orthogonal to or in parallel with each other is not necessarily limited to a state where an angle between the transmission axis of the second polarizer and the in-plane slow axis of the birefringent layer is strictly 90° or 0°. The angle may be deviated from 90° or 0° to some degree. More specifically, the angle between the transmission axis of the second polarizer and the in-plane slow axis of the birefringent layer is set to 80° to 100° (preferably 85° to 95°) or −10° to 10° (preferably −5° to 5°). If the angle is outside the preferable range, the transmittance in the normal direction and an oblique direction at an azimuth angle of 0° or 90° may be lowered.

In the first liquid crystal display device of the present invention, the birefringent layer has a thickness retardation value in an absolute value |Rth| of preferably 400 nm or more and more preferably 600 nm or more. This configuration can further lower the transmittance of light incident in other directions represented by an oblique direction at an azimuth angle of 45°.

In the second liquid crystal display device of the present invention, the birefringent layer has a thickness retardation value in an absolute value |Rth| of preferably 200 nm or more, more preferably 400 nm or more, and particularly preferably 600 nm or more. This configuration further lowers the transmittance of light incident in unwanted directions.

The first liquid crystal display device and the second liquid crystal display device of the present invention are preferably of the vertical-alignment display mode. In that mode, leakage of light is particularly suppressed and the obtained CR is very high. Moreover, the viewing angle characteristics (gamma shift) are remarkably improved while an image blur is suppressed.

The first liquid crystal display device and the second liquid crystal display device of the present invention may each further include a third polarizer provided on the screen side of the liquid crystal panel. The first polarizer, the second polarizer, and the third polarizer are preferably individually an absorptive polarizer or a composite polarizer including a laminate of an absorptive polarizer and a reflective polarizer. At least one of the first polarizer and the second polarizer preferably has a higher single transmittance than the third polarizer. Commonly in an absorptive polarizer, the single transmittance and the contrast of the polarizer have a trade-off relation. Here, since the transmission axis of the first polarizer and the transmission axis of the second polarizer are in parallel with each other, the first polarizer and the second polarizer function to mutually complement the contrast of the other. As a result of the study by the present inventors, it is found out that the transmittance of the polarizer and the transmittance of the liquid crystal display device are related and the contrast of the polarizer and the contrast of the liquid crystal display device are also related. With a configuration where at least one of the first polarizer and the second polarizer has a higher single transmittance than the third polarizer, the transmittance, namely, light use efficiency can be improved, while lowering of the CR is suppressed, in comparison with the case of a liquid crystal display device in which all the first polarizer, the second polarizer, and the third polarizer have the same single transmittance. In a case where only one of the first polarizer and the second polarizer is set to have a higher single transmittance than the third polarizer, either of the polarizers may have a higher single transmittance. Moreover, in the case where one of the polarizers has a higher single transmittance than the third polarizer, the other polarizer may have a single transmittance that is substantially the same as or smaller than the single transmittance of the third polarizer. From the standpoint of production efficiency of the liquid crystal display device, a polarizer provided on the backlight unit side, out of the first polarizer and the second polarizer, preferably has a higher single transmittance than the third polarizer. This configuration allows easy utilization of the production process for a conventional liquid crystal display device including one polarizer only on the backlight unit side of the liquid crystal panel. In other words, the above embodiment is realized by adding a polarizer adjusted to have a higher single transmittance than the third polarizer to such a conventional liquid crystal display device. In contrast, from the standpoint of further improving the transmittance (light use efficiency), preferably, both the first polarizer and the second polarizer have a higher single transmittance than the third polarizer. In this case, the single transmittance of the first polarizer and the single transmittance of the second polarizer may be the same as or different from each other.

In these embodiments, the maximum value Tmax2 and the minimum value Tmin2, among the single transmittances of the first polarizer, the second polarizer, and the third polarizer, have a difference in the absolute value ($\Delta T3 = |Tmax2 - Tmin2|$) of preferably 0.2 to 3.0%, and more preferably 0.5 to 2.0%. If the $\Delta T3$ is less than 0.2%, the transmittance in the entire system may not be sufficiently improved. In contrast, if the ΔT3 is more than 3.0%, the contrast in the entire system may be lowered.

In these embodiments, the contrast (CR1) of the first polarizer, the contrast (CR2) of the second polarizer, and the contrast (CR3) of the third polarizer are not particularly limited, and each may be determined as appropriate. In a case where the contrast can be adjusted independently of the single transmittance, the CR1, the CR2, and the CR3 are preferably as high as possible.

The above embodiments may be employed in appropriate combination as long as the combination is not beyond the spirit of the present invention.

Advantageous Effects of Invention

The present invention provides a liquid crystal display device that is excellent in production efficiency, achieves a high CR, and significantly improves the viewing angle characteristics (reduces the gamma shift), while suppressing an image blur.

DESCRIPTION OF EMBODIMENTS

The polarizer as used herein has a function of extracting polarized light (linearly polarized light) vibrating only in a specific direction from unpolarized light (natural light), partly polarized light, or polarized light. Unless otherwise specified, a "polarizer" as used herein refers only to an element that includes no protective film and has a polarizing function. An absorptive polarizer has a function of absorbing light vibrating in a specific direction and transmitting light (linearly polarized light) vibrating in a direction orthogonal to the specific direction. A reflective polarizer has a function of reflecting light vibrating in a specific direction and transmitting light (linearly polarized light) vibrating in a direction orthogonal to the specific direction.

The in-plane phase difference R is defined as $R=(ns-nf)d$. The thickness retardation value Rth is defined as $Rth=(nz-(nx+ny)/2)d$. The Nz coefficient (biaxial parameter) is defined as $NZ=(ns-nz)/(ns-nf)$.

The ns refers to a bigger one of the nx and ny and the nf refers to a smaller one thereof. The nx and ny each indicate a principal refractive index in the in-plane direction of a birefringent layer (including a liquid crystal panel). The nz indicates a principal refractive index in an out-plane direction, namely, a direction orthogonal to the birefringent layer face. The d indicates a thickness of the birefringent layer.

Optical parameters such as the principal refractive index, the phase difference, and the Nz coefficient herein are measured at a wavelength of 550 nm, unless otherwise specified.

The birefringent layer (retardation film) as used herein refers to a layer (film) having optical anisotropy. The birefringent layer refers to a layer in which any one of the in-plane phase difference R and the thickness retardation value Rth in the absolute value is 10 nm or more (preferably 20 nm or more).

The axial angle as used herein refers to, unless otherwise specified, an angle of an absorption axis of a polarizer, an in-plane slow axis of a birefringent layer, a reflection axis of a reflective polarizer, or a diffusion axis of a diffusion layer.

Embodiment 1

Liquid Crystal Display Device

Figure 1:
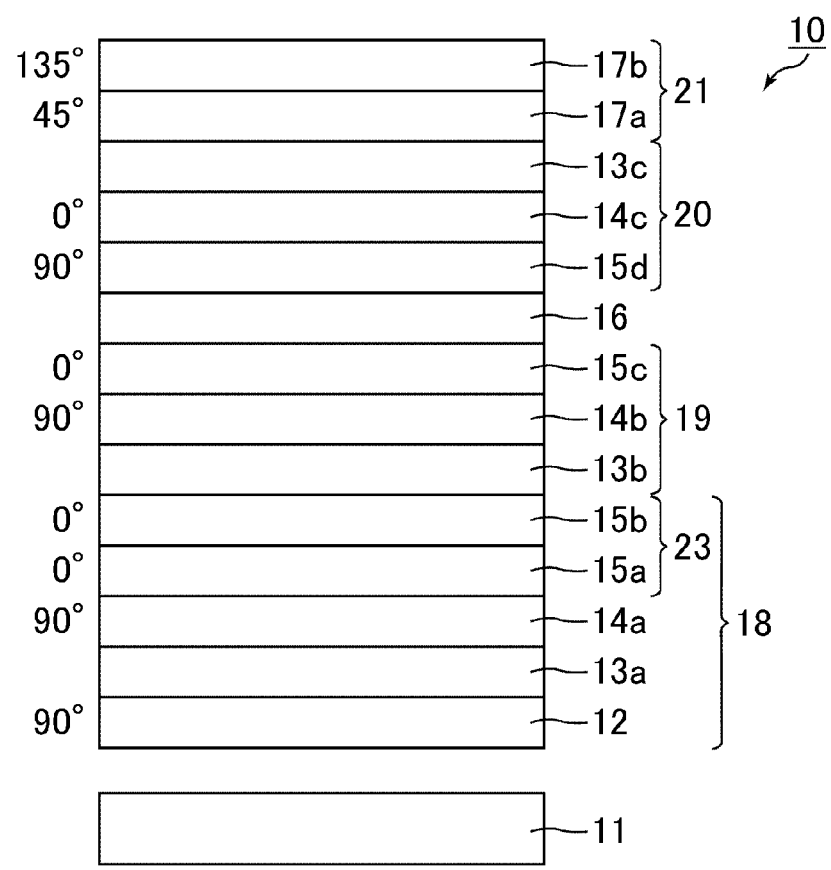
FIG. 1 is a cross-sectional view schematically illustrating a liquid crystal display device according to Embodiment 1.

FIG. 1 is a cross-sectional view schematically illustrating a liquid crystal display device according to Embodiment 1. A liquid crystal display device 10 of the Embodiment 1 is obtained by laminating a backlight unit 11, an anisotropic collimating element 18, a lower polarizing plate 19, a liquid crystal panel 16, an upper polarizing plate 20, and a diffusion element 21 in the stated order from the opposite side (rear side) of the screen surface. The anisotropic collimating element 18 includes a reflective polarizer 12, a TAC (triacetylcellulose) film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 21 includes a diffusion layer 17a and a diffusion layer 17b, and the components are laminated in the stated order from the rear side. The polarizer 14a (including the reflective polarizer 12), the polarizer 14b, and the polarizer 14c correspond to the first polarizer in the present invention, the second polarizer in the present invention, and the third polarizer in the present invention, respectively. The birefringent layer 15a, the birefringent layer 15b, the birefringent layer 15c, and the birefringent layer 15d correspond to the birefringent layer in the present invention, the birefringent layer of another aspect of the present invention, the first birefringent layer in the present invention, and the second birefringent layer in the present invention, respectively. A birefringent layer 23 includes the birefringent layer 15a and the birefringent layer 15b, and the birefringent layer 23 corresponds to the birefringent layer including a plurality of the birefringent layers in the present invention.

An angle value mentioned on the left side of each component illustrated in FIG. 1 indicates the axial angle of the component. The absorption axis of the polarizer 14a and the absorption axis of the polarizer 14b are in parallel with each other. The absorption axis of the polarizer 14b and the in-plane slow axes of the birefringent layer 15a and the birefringent layer 15b are orthogonal to each other. The diffusion axis of the diffusion layer 17a and the diffusion axis of the diffusion layer 17b are orthogonal to each other. An angle between the absorption axis of the polarizer 14b and the diffusion axis of the diffusion layer 17a and an angle between the absorption axis of the polarizer 14b and the diffusion axis of the diffusion layer 17b are individually 45° or 135°. Here, the angle value mentioned on the left side of each component illustrated in FIG. 1 is an angle in the case where the liquid crystal panel 16 is a VA-mode liquid crystal panel. With regard to the above description, the same shall apply to a TN-mode liquid crystal display device (the absorption axis of the polarizer 14b is at 135°, the absorption axis of the polarizer 14c is at 45°).

Preferably, the birefringent layer 23 has a biaxial parameter NZ satisfying 2≤NZ<10 or −9<NZ≤−1 and the birefringent layer has a thickness retardation value Rth in the absolute value |Rth| satisfying |Rth|≥200 nm.

According to the above configuration, the birefringent layer 23 does not substantially work for light incident in the normal direction of the liquid crystal panel 16, light incident in the polarization axis direction of the polarizer 14a and the polarizer 14b, and light incident in the absorption axis direction or the reflection axis direction of the polarizer 14a and the polarizer 14b. Accordingly, a high transmittance is measured. In contrast, the birefringent layer effectively works for light incident at an oblique azimuth relative to the axes of the polarizer 14a and the polarizer 14b and in an oblique direction relative to the surface of the polarizer 14a. Accordingly, a low transmittance is measured. As a result, the light emitted from the backlight unit 11 is selectively collimated, realizing a cross-type light distribution. As described above, leakage of light due to scattering inside the liquid crystal panel 16 is remarkable with regard to the oblique incident light at a specific azimuth. Accordingly, the anisotropic collimating element 18 and the lower polarizing plate 19 may be arranged in such a manner that the transmittance is low at an azimuth where leakage of light is likely to occur and that the transmittance is high at an azimuth where leakage of light is not likely to occur. With such a configuration, leakage of light due to scattering inside the liquid crystal panel 16 is sufficiently lowered, and the CR is effectively improved. Selective collimation of light emitted from the backlight unit 11 for realizing the cross-type light distribution increases the incident light amount in the front direction and the cross direction where the gamma characteristic is favorable and reduces the incident light amount in the X direction where the gamma characteristic is comparatively poor.

The absorption axis of the polarizer 14a and the absorption axis of the polarizer 14b are in parallel with each other, and the absorption axis of the polarizer 14b and the absorption axis of the polarizer 14c are orthogonal to each other. More specifically, the absorption axis of the polarizer 14a and the absorption axis of the polarizer 14b are set to form an angle of −10° to 10° (preferably −5° to 5°), and the absorption axis of the polarizer 14b and the absorption axis of the polarizer 14c are set to form an angle of 87° to 93° (preferably 89° to 91°).

The axial angles of the polarizer 14a and of the polarizer 14b may be appropriately determined. The axial angle of the polarizer 14a and the axial angle of the polarizer 14b are preferably set at an azimuth in a range of −10° to 10°, more preferably in a range of −5° to 5°, and particularly preferably at an azimuth of substantially 0°. This configuration realizes bright display in the normal direction (front direction) and in the vertical and horizontal directions (cross direction). Here, the azimuth at substantially 0° may be an azimuth at a degree achievable in design and production of the liquid crystal display device of the present embodiment in which the azimuth is aimed to be set at 0°, and inaccuracy which may occur in the production process is permissible.

The birefringent layer 23 has a thickness retardation value Rth in the absolute value |Rth| of preferably |Rth|≥400 nm and more preferably |Rth|≥600 nm. With such a thickness retardation value, the transmittance of light incident at an oblique azimuth relative to the axes of the polarizer 14a and the polarizer 14b and in an oblique direction relative to the surface of the polarizer 14a can be further lowered.

Here, the birefringent layer 23 includes a laminate of the birefringent layer 15a and the birefringent layer 15b and these two birefringent layers totally function as a single birefringent layer. This configuration enables the use of a large, inexpensive birefringent layer widely used as an optical compensation film for conventional liquid crystal display devices.

In the following, a detailed description is given on components included in the liquid crystal display device.

(Birefringent Layer)

Materials of the birefringent layer to be used in the Embodiment 1 are not particularly limited, and examples thereof include a stretched polymer film, a liquid crystal material having an immobilized alignment, and a thin plate of an inorganic material. The birefringent layer may be formed by any method. In a case where the birefringent layer is formed from a polymer film, solvent casting, melt extrusion, or the like method may be employed. Alternatively, the co-extrusion method may be employed which forms a plurality of birefringent layers at the same time. The birefringent layer may or may not be stretched as long as a desired phase difference is achieved. The stretching method is not particularly limited and examples thereof include tensile stretching between rolls, compression stretching between rolls, tenter transverse uniaxial stretching, oblique stretching, horizontal and vertical biaxial stretching, and the like methods. The examples further include a special stretching method in which stretching is performed under the action of a shrinking force of a heat-shrinkable film. In a case of being formed from a liquid crystal material, the birefringent layer is formed by, for example, applying a liquid crystal material onto a base film preliminary subjected to an alignment treatment and immobilizing the alignment. As long as a desired phase difference is achieved, the method does not necessarily include a special alignment treatment on the base film, or the method may include a transfer process wherein the liquid crystal material layer is peeled from the base film after the alignment immobilization and transferred to another film. Further, a method in which the alignment of a liquid crystal material is not immobilized may be employed. In a case of being formed from a non-liquid crystal material, the birefringent layer may be formed by the same method as that for the birefringent layer formed from a liquid crystal material. In the following, a further detailed description is given on the birefringent layers for each kind.

(First Birefringent Layer)

A birefringent layer (retardation film) satisfying 2≤NZ<10 herein is referred to as a first birefringent layer. As the first birefringent layer, appropriately usable is a stretched film containing a material having positive intrinsic birefringence. Examples of the material having positive intrinsic birefringence include polycarbonate, polysulfone, polyethersulfone, polyethylene terephthalate, polyethylene, polyvinyl alcohol, norbornene, triacetylcellulose, and diacetylcellulose.

(Second Birefringent Layer)

A birefringent layer (retardation film) satisfying −9<NZ≤−1 herein is referred to as a second birefringent layer. As the second birefringent layer, appropriately usable are a stretched film containing a material having negative intrinsic birefringence and a film obtainable by stretching a film containing a material having positive intrinsic birefringence under the action of a shrinking force of a heat-shrinkable film. From the viewpoint of facilitating the production, preferred is a stretched film containing a material having negative intrinsic birefringence. Examples of the material having negative intrinsic birefringence include a resin composition containing acrylic resin and styrene resin, polystyrene, polyvinyl naphthalene, polyvinyl biphenyl, polyvinyl pyridine, polymethyl methacrylate, polymethyl acrylate, N-substituted maleimide copolymers, polycarbonate including a fluorene skeleton, and triacetylcellulose (especially, one having a small degree of acetylation). In terms of optical characteristics, production efficiency, and heat resistance, preferred is a resin composition containing acrylic resin and styrene resin. An exemplary production method of a film containing such a resin composition is disclosed in JP-A 2008-146003.

(Third Birefringent Layer)

A birefringent layer (retardation film) satisfying 10≤NZ, a so-called negative C plate, herein is referred to as a third birefringent layer. As the third birefringent layer, appropriately usable are a film obtainable by horizontal and vertical biaxial stretching of a film containing a material having positive intrinsic birefringence, a film to which a liquid crystal material (e.g., cholesteric (chiral nematic) liquid crystal, discotic liquid crystal) is applied, and a film to which a non-liquid crystal material containing polyimide or polyamide is applied.

(Fourth Birefringent Layer)

A birefringent layer (retardation film) satisfying NZ≤−9, a so-called positive C plate, herein is referred to as a fourth birefringent layer. As the fourth birefringent layer, usable are a film obtainable by horizontal and vertical biaxial stretching of a film containing a material having negative intrinsic birefringence, a film to which a liquid crystal material (e.g., rod-shaped nematic liquid crystal) is applied, and the like.

In the Embodiment 1, as above, the birefringent layer 23 is the first birefringent layer or the second birefringent layer. The materials, characteristics, axial angles, and the like of the birefringent layer 15c and the birefringent layer 15d may be appropriately determined in consideration of the liquid crystal mode of the liquid crystal panel and the like.

(Polarizer)

The polarizer used in the Embodiment 1 is not particularly limited in terms of the material and optical characteristics thereof, and an absorptive polarizer, a reflective polarizer, or the like may be appropriately used. Specifically, appropriately usable are an absorptive polarizer including a polyvinyl alcohol (PVA) film to which an anisotropic material (e.g., dichromatic iodine complex) is adsorbed and aligned, a reflective polarizer obtainable by uniaxial stretching of a co-extruded film composed of two kinds of resins (e.g., DBEF available from 3M), and a reflective polarizer in which fine metallic wires are periodically aligned (so-called wire grid polarizer). Moreover, also usable is a polarizer including a laminate of an absorptive polarizer and a reflective polarizer.

(Case of Using Absorptive Polarizer or Composite Polarizer)

In a case where only an absorptive polarizer is used, oblique incident light at a specific azimuth is absorbed by the polarizer, so that the light transmission is limited. In such a case, a light collimation is performed, reducing the amount of light incident on a liquid crystal panel (light loss). Accordingly, in a case where only an absorptive polarizer is used, the amount of light incident on a liquid crystal panel is lowered compared to a conventional case where no light collimation is performed (e.g., a liquid crystal display device not including a polarizer 14a and including a polarizer 14b and a polarizer 14c only). To solve the above problem, in a case where only an absorptive polarizer is used, at least one of the polarizer 14a and the polarizer 14b is preferably set to have a large single transmittance. Moreover, the single transmittance is more preferably set to be larger than that of the polarizer 14c. Still more preferably, both of the single transmittances of the polarizer 14a and the polarizer 14b are preferably larger than the single transmittance of the polarizer 14c. Commonly, the single transmittance of an absorptive polarizer and the contrast (degree of polarization) of the polarizer have a trade-off relation, and therefore, the contrast of the polarizer is lowered if the single transmittance is set to be large. In the liquid crystal display device of the Embodiment 1, however, since the absorption axis of the polarizer 14a and the absorption axis of the polarizer 14b are in parallel with each other, the polarizer 14a and the polarizer 14b function to mutually complement the contrast of the other. Consequently, the contrast of the liquid crystal display device as a whole is sufficiently ensured, provided that the entire contrast of the polarizer members including the polarizer 14a and the polarizer 14b is enough. In contrast, since lowering of the contrast of the polarizer 14c directly leads to lowering of the contrast of the liquid crystal display device, it is not preferable that the single transmittance of the polarizer 14c is set to be large.

In a case of using a composite polarizer including a laminate of an absorptive polarizer and a reflective polarizer, namely, a case of using only a composite polarizer, or a case of using an absorptive polarizer and a composite polarizer in combination, absorption (light loss) due to the absorptive polarizer is completely avoided if the reflective polarizer is arranged to be closer to the backlight unit 11 than the absorptive polarizer and the polarizing performance of the reflective polarizer is perfect. In reality, however, the polarizing performance of the reflective polarizer is not perfect, and therefore, part of light desired to be completely reflected passes through the reflective polarizer to be partly absorbed by the absorptive polarizer arranged next. That is, light loss occurs also in the case of using a composite polarizer. If the polarizing performance of the reflective polarizer is perfect, the use of the reflective polarizer only is enough to provide sufficient properties. In such a case, it is almost meaningless to laminate it with an absorptive polarizer to be used in the form of a composite polarizer. In other words, the use of a composite polarizer including a laminate of a reflective polarizer and an absorptive polarizer is almost limited to a case where the performance of the reflective polarizer is insufficient. In such a case, light loss occurs in the absorptive polarizer after passage of light through the reflective polarizer. Even in a configuration including a reflective polarizer, in a case where the reflective polarizer is laminated with an absorptive polarizer to be used in the form of a laminate, the single transmittance of at least one of the polarizer 14a and the polarizer 14b is preferably set to be large and more preferably set to be larger than that of the polarizer 14c as in the case of using only an absorptive polarizer from the standpoint of minimizing the light loss. Still more preferably, both of the single transmittances of the polarizer 14a and the polarizer 14b are larger than that of the polarizer 14c.

In a case where only one of the polarizer 14a and the polarizer 14b has a larger single transmittance than the polarizer 14c, either of the polarizers may have a larger single transmittance. Moreover, in a case where only one of the polarizer 14a and the polarizer 14b has a larger single transmittance than the polarizer 14c, the single transmittance of the other polarizer may be substantially the same as or smaller than that of the polarizer 14c. In terms of the production efficiency of the liquid crystal display device, the polarizer 14a preferably has a larger single transmittance than the polarizer 14c. This configuration allows utilization of the production process for a conventional liquid crystal display device. In contrast, from the standpoint of further improving the transmittance (light use efficiency), both the polarizer 14a and the polarizer 14b preferably have a single transmittance larger than the polarizer 14c. In this case, the single transmittances of the polarizer 14a and the polarizer 14b may be the same as or different from each other.

(Case of Using Reflective Polarizer)

In a case of using a reflective polarizer instead of an absorptive polarizer or in a case of using a laminate of an absorptive polarizer and a reflective polarizer which is prepared by arranging the reflective polarizer closer to the backlight unit 11 than the absorptive polarizer, an oblique incident light at a specific azimuth is reflected by the polarizer so that the light transmission is limited. In this manner, alight collimation effect is achieved. The reflected light is returned to the backlight unit 11 and reflected inside the backlight unit 11 for recycle. In this manner, actual reduction in the amount of light incident on the liquid crystal panel is suppressed. Based on this fact, the use of a reflective polarizer is more preferred. From the standpoint of achieving a high contrast in the case of using a reflective polarizer, at least one of the polarizer 14a, the polarizer 14b, and the polarizer 14b preferably includes an absorptive polarizer. More preferably, the polarizer 14c and one of the polarizer 14a and the polarizer 14b individually include an absorptive polarizer.

For the purpose of ensuring the mechanical strength and moisture and heat resistance, both surfaces of the polarizer may be laminated with a protective film such as triacetylcellulose (TAC) films. The protective film is bonded to a polarizer through any suitable adhesive layer (not illustrated). Alternatively, the birefringent layer may serve as a protective film.

The "adhesive layer" as used herein refers to a layer for bonding and uniting surfaces of adjacent optical members with an adhesive strength in an adhering time which are acceptable for practical use. Examples of materials of the adhesive layer include adhesives and anchor coat agents. The adhesive layer may include a multilayered structure including an adherend, an anchor coat agent layer formed on the surface of the adherend, and an adhesive agent layer formed on the anchor coat agent layer. Alternatively, the adhesive layer may be a thin layer that is not visible to the naked eye.

(Liquid Crystal Panel)

In the liquid crystal display device 10 of the Embodiment 1, the liquid crystal mode of the liquid crystal panel 16 is not particularly limited. Black display may be performed by aligning liquid crystal molecules in the liquid crystal layer in a direction perpendicular to the substrate surface, in parallel to the substrate surface, or in a direction not perpendicular or in parallel to the substrate surface. From the standpoint of achieving a high CR, a vertical alignment (VA) mode is more preferable in which black display is performed by aligning liquid crystal molecules in the liquid crystal layer in a direction substantially perpendicular to the substrate surface. In other words, the display mode of the liquid crystal display device 10 is preferably the vertical alignment mode. The driving system of the liquid crystal panel may be a simple matrix (passive matrix) type, a plasma address type or the like, instead of a TFT (active matrix) type. For example, the liquid crystal panel includes a pair of substrates each including an electrode and a liquid crystal layer placed between the pair of substrates, and performs display by application of a voltage between the electrodes.

Examples of the VA mode include a multi-domain vertical alignment (MVA) mode, a continuous pinwheel alignment (CPA) mode, a patterned vertical alignment (PVA) mode, a biased vertical alignment (BVA) mode, a reverse twisted nematic (RTN) mode, an ultra violet induced VA (UV2A) mode, a polymer sustained alignment (PSA) mode, an in-plane switching-vertical alignment (IPS-VA) mode, and a transverse bend alignment (TBA) mode. In the VA mode, the liquid crystal molecules have an average pretilt angle of preferably 80° or more (more preferably 85° or more).

(Backlight Unit)

The backlight unit 11 is not particularly limited, and one including at least a light source such as a cold cathode fluorescent lamp (CCFL), a hot cathode fluorescent lamp (HCFL), and a light emitting diode (LED) may be appropriately used. Commonly, the backlight unit 11 preferably includes a diffusion layer such as diffusion plates and diffusion sheets for the purpose of planarly uniformizing light emitted from dot or linear light source. In the Embodiment 1, collimation (condensation) of light incident on the liquid crystal panel is performed by the polarizer 14a and the birefringent layer 23 (including the polarizer 14b) arranged between the backlight unit 11 and the polarizer 14b, and therefore, the backlight unit 11 itself does not necessarily have a collimation function. From the standpoint of increasing the brightness in the normal direction by further collimating light incident on the liquid crystal panel, further improving the contrast, or using the conventional backlight unit 11 as it is without alteration, the backlight unit 11 itself may include an optical sheet such as lens sheets and prism sheets and have a collimating function to some degree.

(Diffusion Layer)

The diffusion element 21 is not particularly limited. For example, the diffusion element 21 includes a laminate of the diffusion layer 17a and the diffusion layer 17b without a bonding layer or an adhesive layer interposed therebetween, in which the diffusion layer 17a and the diffusion layer 17b each include a fine irregular structure. Here, the fine irregular structure is not particularly limited as long as it has a desired scattering characteristic and the effect of the present invention can be achieved. The diffusion axis of the diffusion layer 17a and the diffusion axis of the diffusion layer 17b are preferably orthogonal to each other. With this configuration, in a case where the liquid crystal panel 16 is a liquid crystal panel of the VA mode, combination with light emitted from the backlight unit 11 which has been collimated to have the cross-type light distribution as described above allows apart of the light component having a favorable gamma characteristic in the front direction and the cross direction which has passed through the liquid crystal panel 16 to be diffused in the X direction. Accordingly, a favorable gamma characteristic is achieved also in the X direction as well as in the front and cross directions.

Example 1

As a liquid crystal display device of Example 1, the liquid crystal display device 10 of the Embodiment 1 was actually produced. Here, the angle value mentioned on the left side of each component illustrated in FIG. 1 is an axial angle of the component. The axis of the polarizer means an absorption axis. The axis of the birefringent layer means an in-plane slow axis. The axis of the reflective polarizer means a reflective axis. The axis of the diffusion layer means a diffusion axis. As the birefringent layer 15a and the birefringent layer 15b were used birefringent layers having an in-plane phase difference R of 55 nm, a thickness retardation value Rth of −198 nm, and a biaxial parameter NZ of 4.1. As the birefringent layer 15c and the birefringent layer 15d were used birefringent layers having an in-plane phase difference R of 55 nm, a thickness retardation value Rth of −125 nm, and a biaxial parameter NZ of 2.8. The material of these birefringent layers was triacetylcellulose (TAC). The reflective polarizer 12 used was a DBEF-D available from 3M. The polarizer 14a, the polarizer 14b, and the polarizer 14c were individually an absorptive polarizer including a polyvinyl alcohol (PVA) film to which a dichroic iodine complex was adsorbed and aligned. The TAC film 13a, the TAC film 13b, and the TAC film 13c individually had an in-plane phase difference R of 0 nm and a thickness retardation value Rth of 52 nm and were bonded to the polarizers. The liquid crystal panel 16 was a VA-mode liquid crystal panel that is used for an LCD TV (product name: LC32-H7) available from SHARP CORPORATION. The display mode of the liquid crystal panel was the UV2A mode. The backlight unit 11 used was a backlight unit used in an LCD TV (product name: LC30-SE1) available from SHARP CORPORATION. The backlight unit had a configuration including an LED light source, a diffusion plate, a diffusion sheet, and a lens sheet laminated in the stated order. The diffusion element 21 included a laminate of the diffusion layer 17a and the diffusion layer 17b without a bonding layer or an adhesive layer interposed therebetween. The diffusion layer 17a and the diffusion layer 17b used were individually a diffusion sheet including a fine irregular structure, specifically, an anisotropic diffusion film LSD 40°×0.2° available from Luminit, LLC. Here, "40°×0.2°" means that the FWHM in one direction is 40° and the FWHM in a direction orthogonal to the one direction is 0.2°. As mentioned above, the FWHM means the full width at half maximum of the luminance. The azimuth where the FWHM is largest is defined as a diffusion axis. Accordingly, in the liquid crystal display device of the Example 1, a direction where the FWHM is 40° refers to a direction of 45° in the diffusion layer 17a and a direction of 135° in the diffusion layer 17b.

Figure 2:
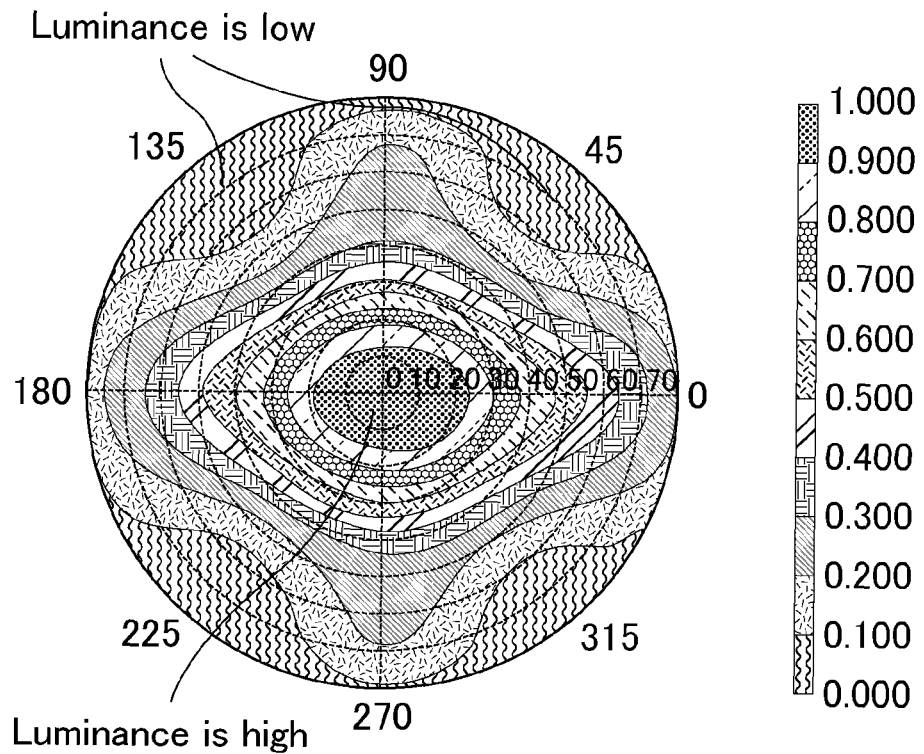
FIG. 2 is a contour view showing distribution of light emitted from a backlight of a liquid crystal display device according to Example 1.
Figure 3:
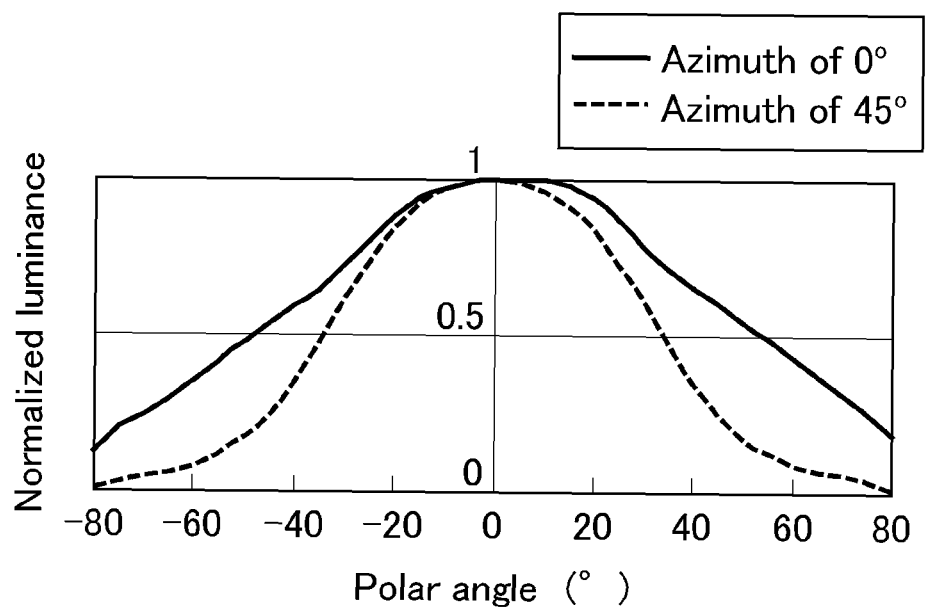
FIG. 3 is a graph showing distribution of light emitted from the backlight of the liquid crystal display device according to the Example 1 in a case of an azimuth angle of 0° or 45°.
Figure 4:
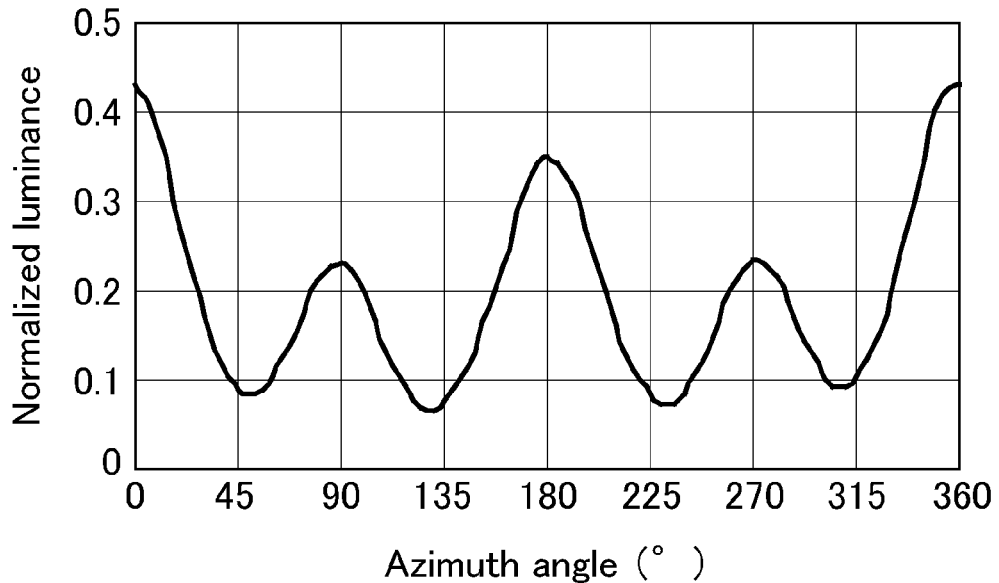
FIG. 4 is a graph showing distribution of light emitted from the backlight of the liquid crystal display device according to the Example 1 in a case of a polar angle of 60°.

Next, for understanding of the distribution of light emitted from the backlight onto the VA-mode liquid crystal panel 16 included in the liquid crystal display device of the Example 1, components on the rear side of the liquid crystal panel 16 only, namely, the lower polarizing plate 19 and the anisotropic collimating element 18 were attached to a bare glass and the viewing angle characteristics (luminance) were measured on the backlight unit 11. FIG. 2 is a contour view showing distribution of light emitted from a backlight of a liquid crystal display device according to Example 1. FIG. 3 is a graph showing distribution of light emitted from the backlight of the liquid crystal display device according to the Example 1 in a case of an azimuth angle of 0° or 45°. FIG. 4 is a graph showing distribution of light emitted from the backlight of the liquid crystal display device according to the Example 1 in a case of a polar angle of 60°. The luminance shown in FIGS. 2, 3, and 4 is normalized with the front luminance.

As shown in FIG. 2, the distribution (alignment characteristics) of light emitted from the backlight onto the liquid crystal panel 16 in the liquid crystal display device of the Example 1 is in a substantially cross type. Such distribution of light limits light incident on the liquid crystal panel at azimuths of 45°, 135°, 225°, and 315° where the gamma characteristic is poor. This is also supported by FIG. 3 showing that the luminance at an azimuth of 0° is higher than the luminance at an azimuth of 45° regardless of the polar angle. This is further supported by FIG. 4 showing that the luminance at azimuths of 45°, 135°, 225°, and 315° is lower than the luminance at azimuths of 0° (360°), 90°, 180°, and 270°.

Soon after passage through the liquid crystal panel 16 and the upper polarizing plate 20, the transmitted light maintains light distribution characteristics in a substantially cross type and contains only light having a comparatively favorable gamma characteristic. Distribution of such light by the diffusion element 21 in a direction of the diffusion axis realizes a comparatively favorable gamma characteristic in that diffusion direction. At this time, the use of a diffusion film having an FWHM in the cross direction of 10° or less is preferable because distribution (diffusion) in the cross direction is not needed and subjective evaluation by the present inventors revealed that an image blur is less likely to be observed if the diffusion film has an FWHM of 10° or less. The FWHM in the cross section refers to an average value of the FWHM in the vertical and horizontal directions (cross direction).

Embodiment 2

Liquid Crystal Display Device

Figure 5:
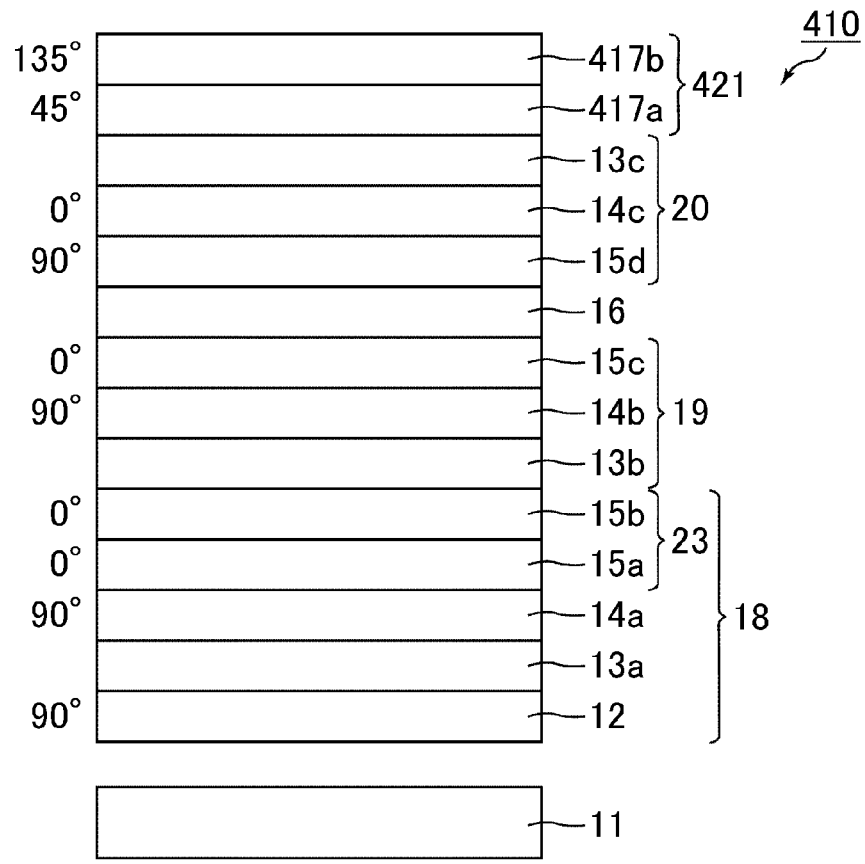
FIG. 5 is a cross-sectional view schematically illustrating a liquid crystal display device according to Embodiment 2.

FIG. 5 is a cross-sectional view schematically illustrating a liquid crystal display device according to Embodiment 2. A liquid crystal display device 410 of the Embodiment 2 is obtained by laminating a backlight unit 11, an anisotropic collimating element 18, a lower polarizing plate 19, a liquid crystal panel 16, an upper polarizing plate 20, and a diffusion element 421 in the stated order from the rear side. The anisotropic collimating element 18 includes a reflective polarizer 12, a TAC film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 421 includes a diffusion layer 417a and a diffusion layer 417b, and the components are laminated in the stated order from the rear side. The configuration of the liquid crystal display device 410 of the Embodiment 2 is the same as that of the liquid crystal display device 10 of the Embodiment 1, except that the diffusion layer 417a, the diffusion layer 417b, and the diffusion element 421 are used instead of the diffusion layer 17a, the diffusion layer 17b, and the diffusion element 21. The FWHM values of the diffusion layers 417a and 417b are different from the FWHM values of the diffusion layers 17a and 17b, respectively.

In the liquid crystal display device of the Embodiment 2, in the same manner as in the liquid crystal display device of the Embodiment 1, selective collimation of light emitted from the backlight unit 11 for realizing the cross-type light distribution increases the incident light amount in the front direction and the cross direction where the gamma characteristic is favorable and reduces the incident light amount in the X direction where the gamma characteristic is comparatively poor in the case where the liquid crystal panel is, for example, of the VA mode. A part of a light component with favorable gamma characteristic in the front direction and the cross direction, after passage through the liquid crystal panel 16, can be diffused in the X direction. As a result, a favorable gamma characteristic is achieved in the X direction as well as in the front direction and the cross direction.

The modes described in the Embodiment 1 may be appropriately employed in the Embodiment 2.

Example 2

As a liquid crystal display device of Example 2, the liquid crystal display device 410 of the Embodiment 2 was actually produced. The diffusion layer 417a and the diffusion layer 417b used were individually an anisotropic diffusion film LSD 60°×1° available from Luminit, LLC. In the liquid crystal display device of the Example 2, a direction where the FWHM is 60° refers to a direction of 45° in the diffusion layer 417a and a direction of 135° in the diffusion layer 417b. Except for the above, the liquid crystal display device of the Example 2 was the same as the liquid crystal display device of the Example 1.

Embodiment 3

Liquid Crystal Display Device

Figure 6:
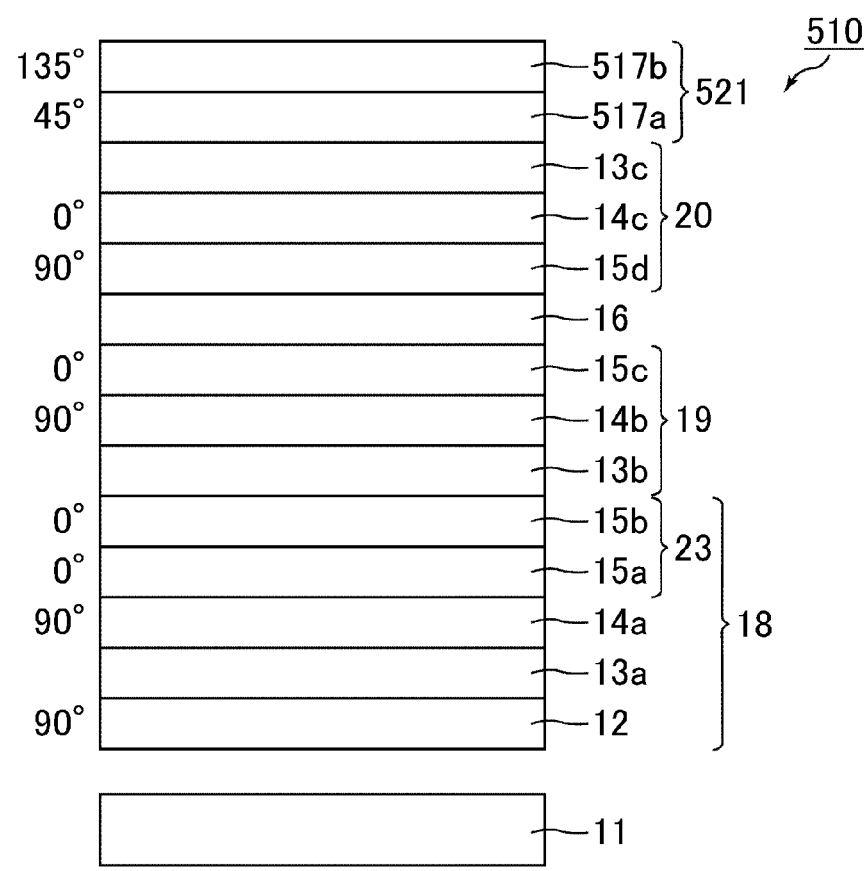
FIG. 6 is a cross-sectional view schematically illustrating a liquid crystal display device according to Embodiment 3.

FIG. 6 is a cross-sectional view schematically illustrating a liquid crystal display device according to Embodiment 3. A liquid crystal display device 510 of the Embodiment 3 is obtained by laminating a backlight unit 11, an anisotropic collimating element 18, a lower polarizing plate 19, a liquid crystal panel 16, an upper polarizing plate 20, and a diffusion element 521 in the stated order from the rear side. The anisotropic collimating element 18 includes a reflective polarizer 12, a TAC film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 521 includes a diffusion layer 517a and a diffusion layer 517b, and the components are laminated in the stated order from the rear side. The configuration of the liquid crystal display device 510 of the Embodiment 3 is the same as that of the liquid crystal display device 10 of the Embodiment 1, except that the diffusion layer 517a, the diffusion layer 517b, and the diffusion element 521 are used instead of the diffusion layer 17a, the diffusion layer 17b, and the diffusion element 21. The FWHM values of the diffusion layers 517a and 517b are different from the FWHM values of the diffusion layers 17a and 17b, and the FWHM values of the diffusion layers 417a and 417b, respectively.

In the liquid crystal display device of the Embodiment 3, in the same manner as in the liquid crystal display device of the Embodiment 1, selective collimation of light emitted from the backlight unit 11 for realizing the cross-type light distribution increases the incident light amount in the front direction and the cross direction where the gamma characteristic is favorable and reduces the incident light amount in the X direction where the gamma characteristic is comparatively poor in the case where the liquid crystal panel is, for example, of the VA mode. A part of a light component with favorable gamma characteristic in the front direction and the cross direction, after passage through the liquid crystal panel 16, can be diffused in the X direction. As a result, a favorable gamma characteristic is achieved in the X direction as well as in the front direction and the cross direction.

The modes described in the Embodiment 1 may be appropriately employed in the Embodiment 3.

Example 3

As a liquid crystal display device of Example 3, the liquid crystal display device 510 of the Embodiment 3 was actually produced. The diffusion layer 517a and the diffusion layer 517b used were individually an anisotropic diffusion film LSD 30°×5° available from Luminit, LLC. In the liquid crystal display device of the Example 3, a direction where the FWHM is 30° refers to a direction of 45° in the diffusion layer 517a and a direction of 135° in the diffusion layer 517b. Except for the above, the liquid crystal display device of the Example 3 was the same as the liquid crystal display device of the Example 1.

Comparative Embodiment 1

Figure 7:
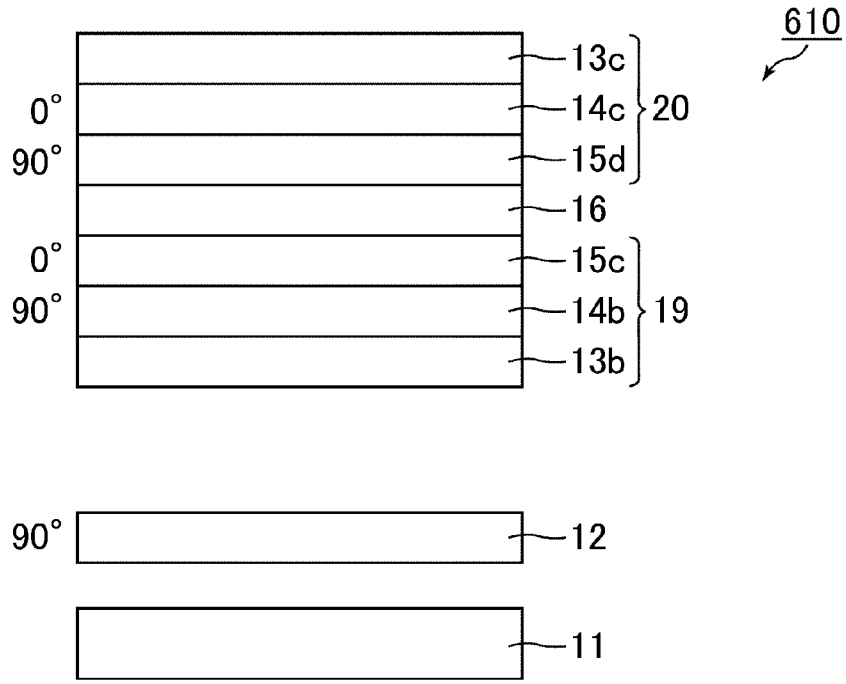
FIG. 7 is a cross-sectional view schematically illustrating a liquid crystal display device according to Comparative Embodiment 1.

FIG. 7 is a cross-sectional view schematically illustrating a liquid crystal display device according to Comparative Embodiment 1. A liquid crystal display device 610 of the Comparative Embodiment 1 is obtained by laminating a backlight unit 11, a reflective polarizer 12, a lower polarizing plate 19, a liquid crystal panel 16, and an upper polarizing plate 20 in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The configuration of the liquid crystal display device 610 of the Comparative Embodiment 1 is the same as that of the liquid crystal display device 10 of the Embodiment 1, except that the TAC film 13a, the polarizer 14a, the birefringent layer 15a, the birefringent layer 15b, the diffusion layer 17a, and the diffusion layer 17b are not included.

Comparative Example 1

Conventional Liquid Crystal Display Device of VA Mode

As a liquid crystal display device of Comparative Example 1, the liquid crystal display device 610 of the Comparative Embodiment 1 was actually produced. The liquid crystal display device of the Comparative Example 1 was the same as the liquid crystal display device of the Example 1, except that the TAC film 13a, the polarizer 14a, the birefringent layer 15a, the birefringent layer 15b, the diffusion layer 17a, and the diffusion layer 17b were not included.

Figure 8:
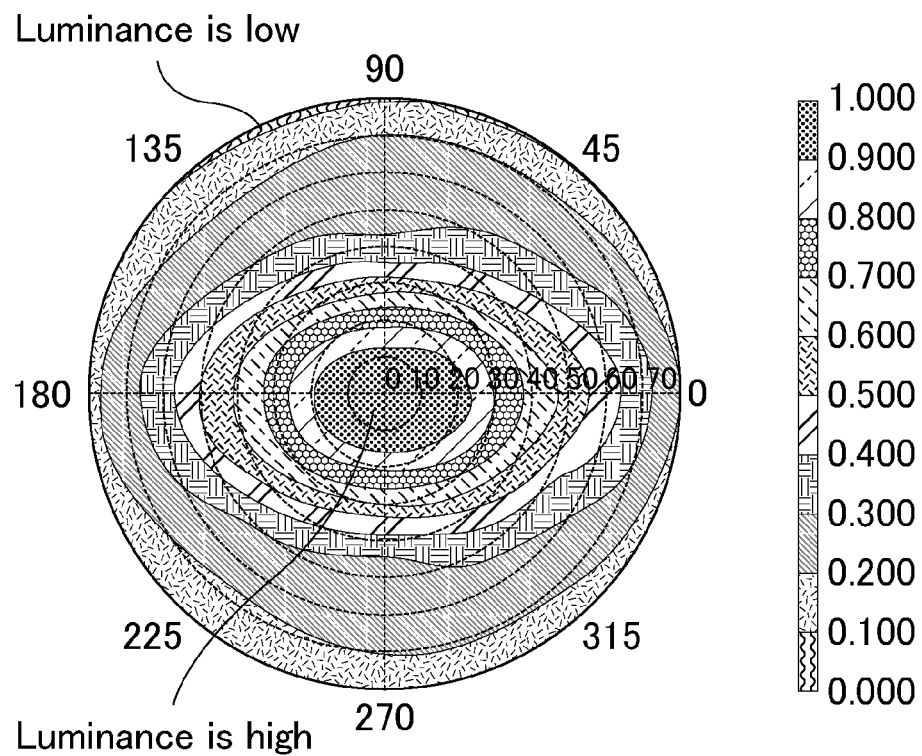
FIG. 8 is a contour view showing distribution of light emitted from a backlight of a liquid crystal display device according to the Comparative Example 1.
Figure 9:
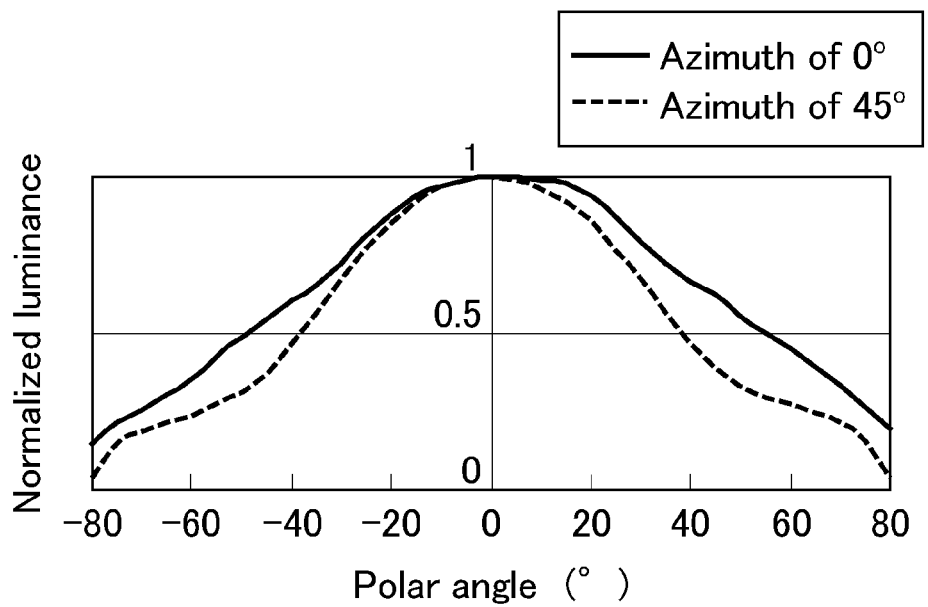
FIG. 9 is a graph showing distribution of light emitted from the backlight of the liquid crystal display device according to the Comparative Example 1 in a case of an azimuth angle of 0° or 45°.
Figure 10:
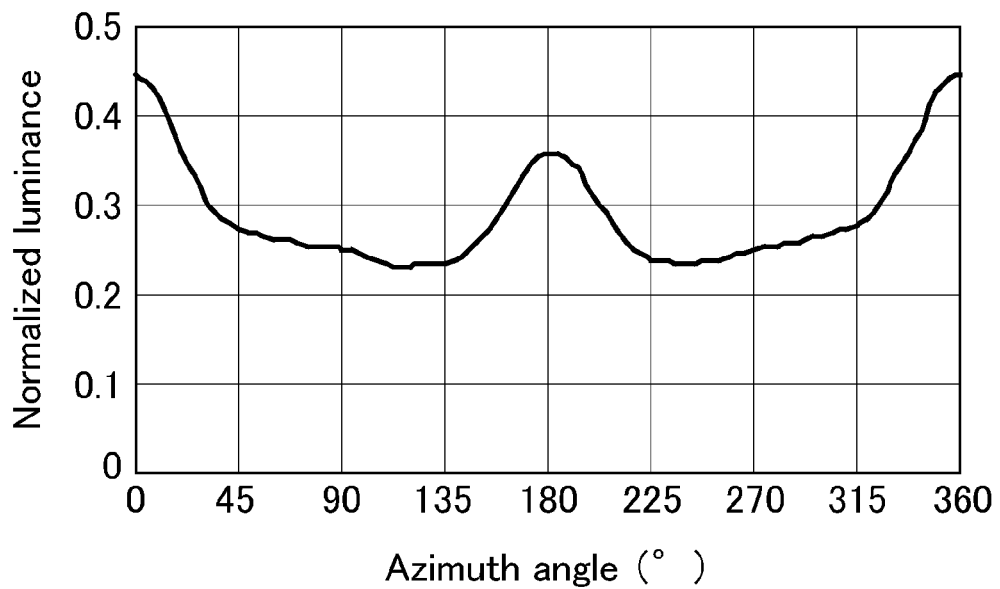
FIG. 10 is a graph showing distribution of light emitted from the backlight of the liquid crystal display device according to the Comparative Example 1 in a case of a polar angle of 60°.

Next, for understanding of the distribution of the light emitted from the backlight onto the VA-mode liquid crystal panel 16 included in the liquid crystal display device of the Comparative Example 1, components on the rear side of the liquid crystal panel 16 only, namely, the lower polarizing plate 19 and the reflective polarizer 12 were attached to a bare glass and the viewing angle characteristics (luminance) were measured on the backlight unit 11. FIG. 8 is a contour view showing distribution of light emitted from a backlight of a liquid crystal display device according to the Comparative Example 1. FIG. 9 is a graph showing distribution of light emitted from the backlight of the liquid crystal display device according to the Comparative Example 1 in a case of an azimuth angle of 0° or 45°. FIG. 10 is a graph showing distribution of light emitted from the backlight of the liquid crystal display device according to the Comparative Example 1 in a case of a polar angle of 60°. The luminance shown in FIGS. 8, 9, and 10 is normalized with the front luminance.

As shown in FIG. 8, the distribution (alignment characteristics) of light emitted from the backlight onto the liquid crystal panel 16 in the liquid crystal display device of the Comparative Example 1 does not show a cross-type anisotropy but shows an anisotropy in the shape of concentric circles. Such distribution of light does not limit light incident on the liquid crystal panel at azimuths of 45°, 135°, 225°, and 315° where the gamma characteristic is poor. This is also supported by the fact that the luminance at an azimuth of 45° in FIG. 9 is higher than the luminance at an azimuth of 45° in FIG. 3 regardless of the polar angle. This is further supported by the fact that the luminance at azimuths of 45°, 135°, 225°, and 315° in FIG. 10 is higher than the luminance at azimuths of 45°, 135°, 225°, and 315° in FIG. 4.

Comparative Embodiment 2

Figure 11:
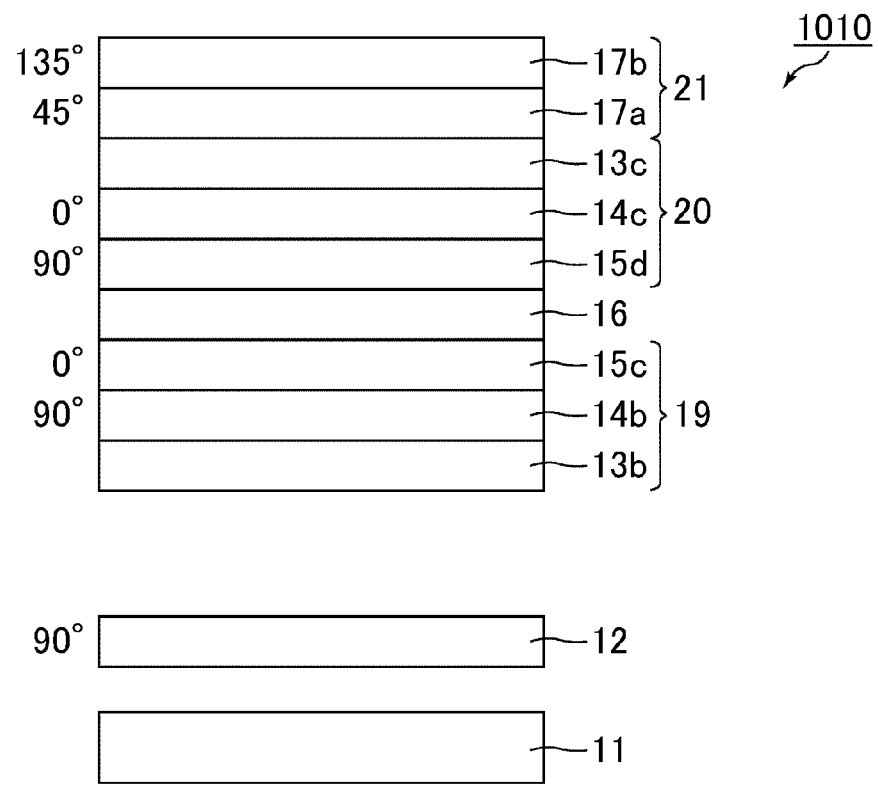
FIG. 11 is a cross-sectional view schematically illustrating a liquid crystal display device according to Comparative Embodiment 2.

FIG. 11 is a cross-sectional view schematically illustrating a liquid crystal display device according to Comparative Embodiment 2. A liquid crystal display device 1010 of the Comparative Embodiment 2 is obtained by laminating a backlight unit 11, a reflective polarizer 12, a lower polarizing plate 19, a liquid crystal panel 16, an upper polarizing plate 20, and a diffusion element 21 in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 21 includes a diffusion layer 17a and a diffusion layer 17b, and the components are laminated in the stated order from the rear side. The configuration of the liquid crystal display device 1010 of the Comparative Embodiment 2 was the same as that of the liquid crystal display device 610 of the Comparative Embodiment 1, except that the diffusion layer 17a and the diffusion layer 17b were used.

Comparative Example 2

As a liquid crystal display device of Comparative Example 2, the liquid crystal display device 1010 of the Comparative Embodiment 2 was actually produced. The diffusion layer 17a and the diffusion layer 17b used were individually an anisotropic diffusion film LSD 40°×0.2° available from Luminit, LLC. In the liquid crystal display device of the Comparative Example 2, a direction where the FWHM is 40° refers to a direction of 45° in the diffusion layer 17a and a direction of 135° in the diffusion layer 17b. Except for the above, the liquid crystal display device of the Comparative Example 2 was the same as the liquid crystal display device of the Comparative Example 1.

Comparative Embodiment 3

Figure 12:
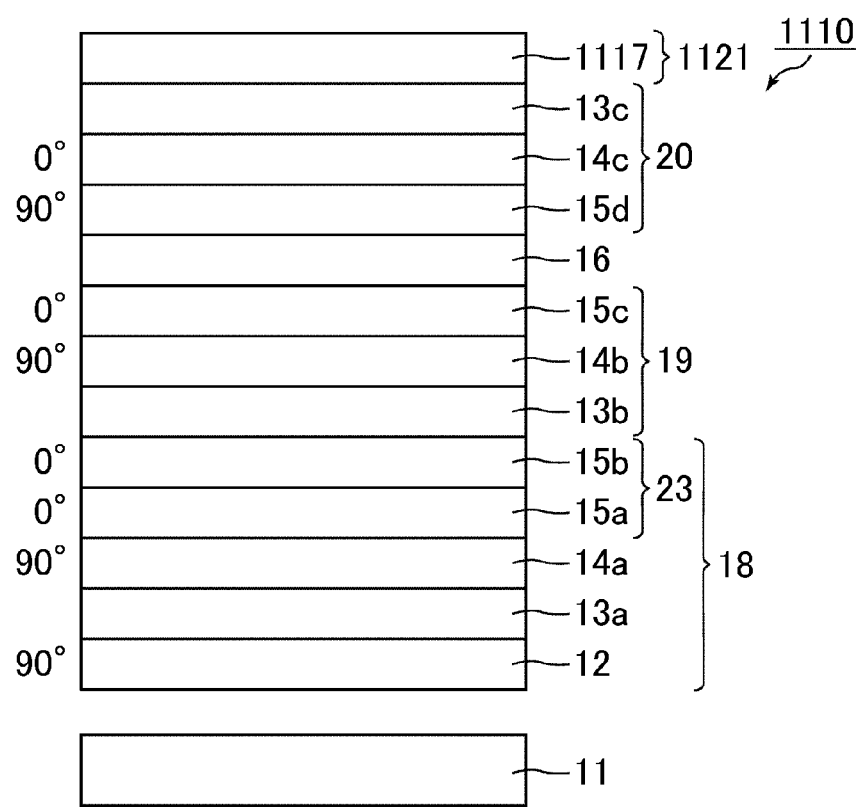
FIG. 12 is a cross-sectional view schematically illustrating a liquid crystal display device according to Comparative Embodiment 3.

FIG. 12 is a cross-sectional view schematically illustrating a liquid crystal display device according to Comparative Embodiment 3. A liquid crystal display device 1110 of the Comparative Embodiment 3 is obtained by laminating a backlight unit 11, an anisotropic collimating element 18, a lower polarizing plate 19, a liquid crystal panel 16, an upper polarizing plate 20, and a diffusion element 1121 in the stated order from the rear side. The anisotropic collimating element 18 includes a reflective polarizer 12, a TAC film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 1121 includes a diffusion layer 1117. The configuration of the liquid crystal display device 1110 of the Comparative Embodiment 3 is the same as that of the liquid crystal display device 10 of the Embodiment 1, except that the diffusion layer 1117 and the diffusion element 1121 are used instead of the diffusion layer 17a, the diffusion layer 17b, and the diffusion element 21.

Comparative Example 3

As a liquid crystal display device of Comparative Example 3, the liquid crystal display device 1110 of the Comparative Embodiment 3 was actually produced. The diffusion layer 1117 used was an isotropic diffusion film LSD 40° available from Luminit, LLC. Except for the above, the liquid crystal display device of the Comparative Example 3 was the same as the liquid crystal display device of the Example 1.

Comparative Embodiment 4

Figure 13:
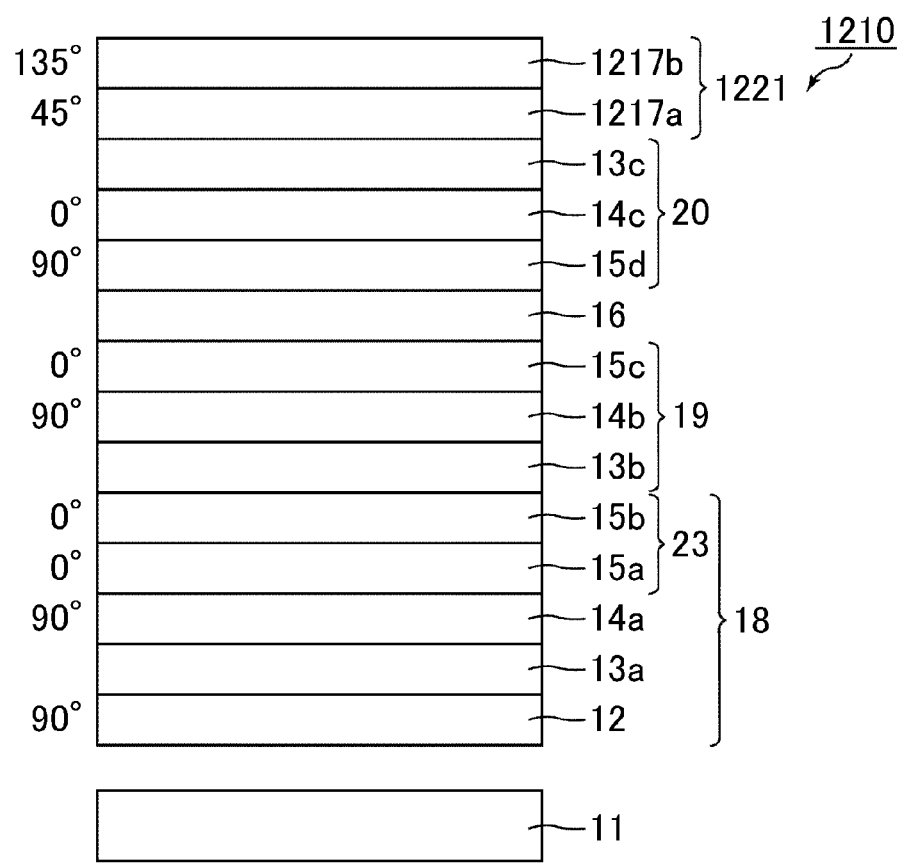
FIG. 13 is a cross-sectional view schematically illustrating a liquid crystal display device according to Comparative Embodiment 4.

FIG. 13 is a cross-sectional view schematically illustrating a liquid crystal display device according to Comparative Embodiment 4. A liquid crystal display device 1210 of the Comparative Embodiment 4 is obtained by laminating a backlight unit 11, an anisotropic collimating element 18, a lower polarizing plate 19, a liquid crystal panel 16, an upper polarizing plate 20, and a diffusion element 1221 in the stated order from the rear side. The anisotropic collimating element 18 includes a reflective polarizer 12, a TAC film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 1221 includes a diffusion layer 1217a and a diffusion layer 1217b, and the components are laminated in the stated order from the rear side. The configuration of the liquid crystal display device 1210 of the Comparative Embodiment 4 is the same as that of the liquid crystal display device 10 of the Embodiment 1, except that the diffusion layer 1217a, the diffusion layer 1217b, and the diffusion element 1221 are used instead of the diffusion layer 17a, the diffusion layer 17b, and the diffusion element 21.

Comparative Example 4

As a liquid crystal display device of Comparative Example 4, the liquid crystal display device 1210 of the Comparative Embodiment 4 was actually produced. The diffusion layer 1217a and the diffusion layer 1217b used were individually an anisotropic diffusion film LSD 60°×10° available from Luminit, LLC. In the liquid crystal display device of the Comparative Example 4, a direction where the FWHM is 60° refers to a direction of 45° in the diffusion layer 1217a and a direction of 135° in the diffusion layer 1217b. Except for the above, the liquid crystal display device of the Comparative Example 4 was the same as the liquid crystal display device of the Example 1.

Comparative Embodiment 5

Figure 14:
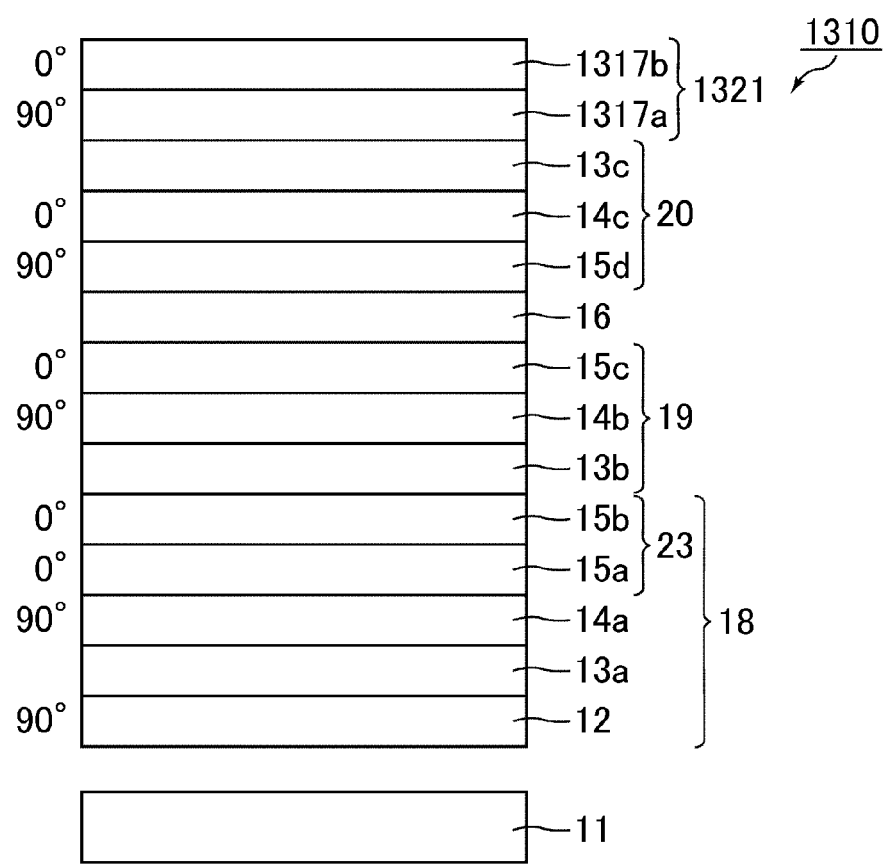
FIG. 14 is a cross-sectional view schematically illustrating a liquid crystal display device according to Comparative Embodiment 5.
Figure 15:
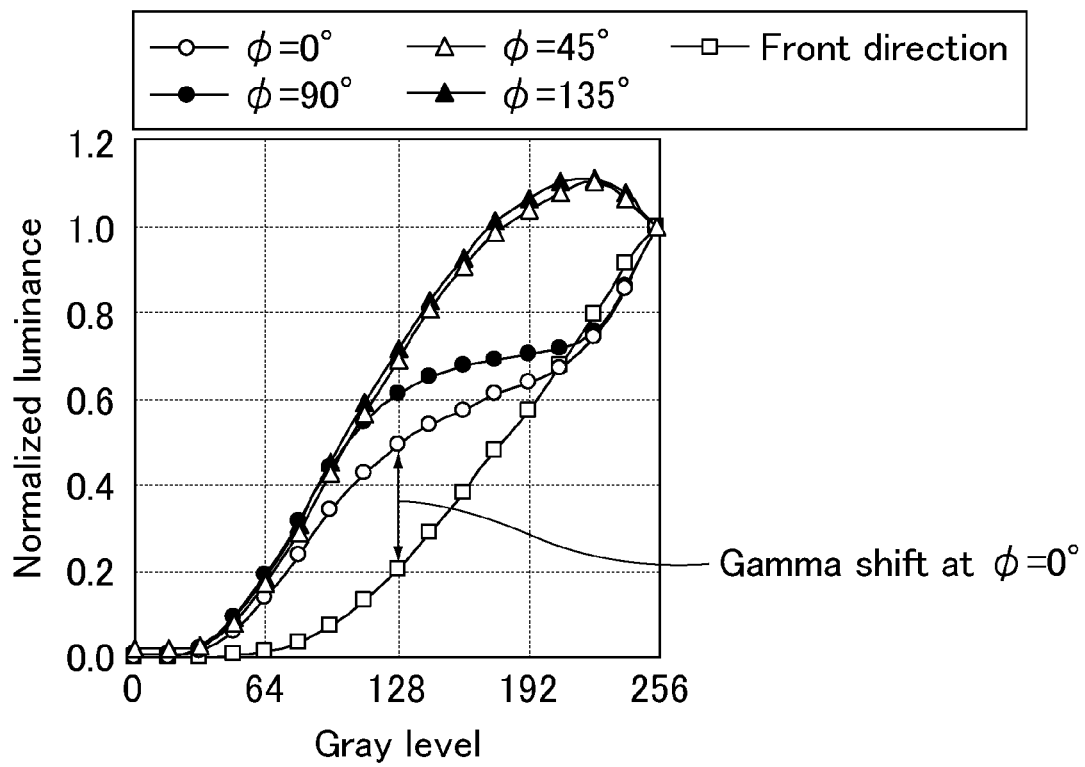
FIG. 15 is a characteristic chart of a gamma shift in a VA-mode liquid crystal display device.
Figure 16:
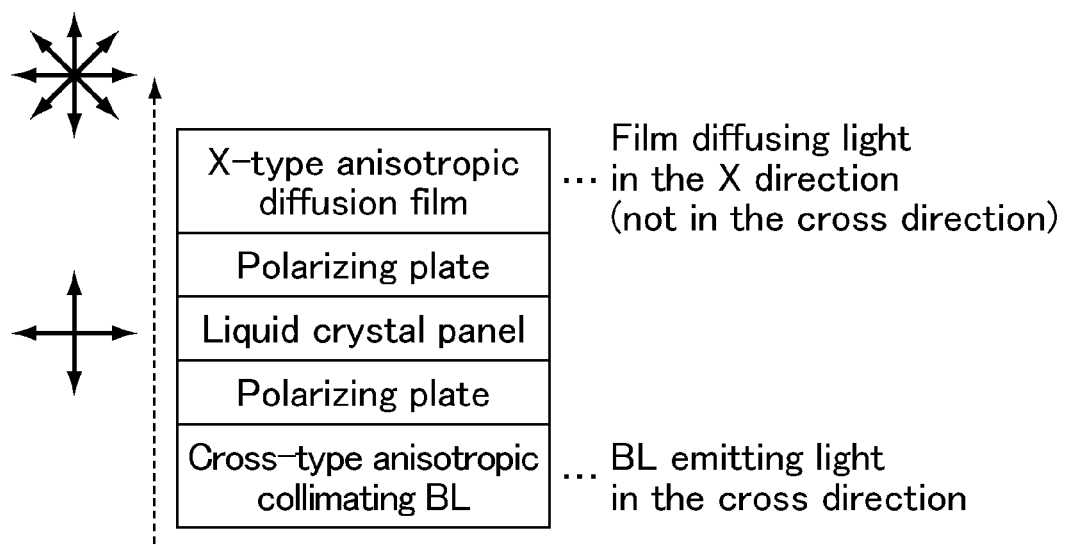
FIG. 16 is a cross-sectional view schematically illustrating the liquid crystal display device according to the Embodiments 1 to 3.

FIG. 14 is a cross-sectional view schematically illustrating a liquid crystal display device according to Comparative Embodiment 5. A liquid crystal display device 1310 of the Comparative Embodiment 5 is obtained by laminating a backlight unit 11, an anisotropic collimating element 18, a lower polarizing plate 19, a liquid crystal panel 16, an upper polarizing plate 20, and a diffusion element 1321 in the stated order from the rear side. The anisotropic collimating element 18 includes a reflective polarizer 12, a TAC film 13a, a polarizer 14a, a birefringent layer 15a, and a birefringent layer 15b, and the components are laminated in the stated order from the rear side. The lower polarizing plate 19 includes a TAC film 13b, a polarizer 14b, and a birefringent layer 15c, and the components are laminated in the stated order from the rear side. The upper polarizing plate 20 includes a birefringent layer 15d, a polarizer 14c, and a TAC film 13c, and the components are laminated in the stated order from the rear side. The diffusion element 1321 includes a diffusion layer 1317a and the diffusion layer 1317b, and the components are laminated in the stated order from the rear side. The configuration of the liquid crystal display device 1310 of the Comparative Embodiment 5 is the same as that of the liquid crystal display device 10 of the Embodiment 1, except that the diffusion layer 1317a, the diffusion layer 1317b, and the diffusion element 1321 are used instead of the diffusion layer 17a, the diffusion layer 17b, and the diffusion element 21. The diffusion axis of the diffusion layer 1317a has a value different from that of the diffusion axis of the diffusion layer 17a. The diffusion axis of the diffusion layer 1317b has a value different from that of the diffusion axis of the diffusion layer 17b.

Comparative Example 5

As a liquid crystal display device of Comparative Example 5, the liquid crystal display device 1310 of the Comparative Embodiment 5 was actually produced. The diffusion axis of the diffusion layer 1317a was set to have an angle of 90° and the diffusion axis of the diffusion layer 1317b was set to have an angle of 0°. The diffusion layer 1317a and the diffusion layer 1317b used were individually an anisotropic diffusion film LSD 40°×0.2° available from Luminit, LLC. In the liquid crystal display device of the Comparative Example 5, a direction where the FWHM is 40° refers to a direction of 90° in the diffusion layer 1317a and a direction of 0° in the diffusion layer 1317b. Except for the above, the liquid crystal display device of the Comparative Example 5 was the same as the liquid crystal display device of the Example 1.

The liquid crystal display devices of the Examples 1 to 3 and the Comparative Examples 1 to 5 were evaluated for the amount of the gamma shift and the degree of image blur (by subjective visual evaluation). Table 1 shows the results.

The magnitude relation of the diffusion degree that characterizes the diffusion anisotropy of the diffusion element was determined based on the magnitude of the FWHMs in the cross direction and in the X direction of the diffusion element. A case where the FWHMs were the same was determined to be isotropic.

TABLE 1

| | | Diffusion sheet (Diffusion element) | | | Evaluation result | |
| --- | --- | --- | --- | --- | --- | --- |
| | Backlight | Sheet (Diffusion layer) | FWHM (°) in cross direction | FWHM (°) in X direction | Gamma shift amount | Image blur |
| Example 1 | Cross-type | Anisotropic 40° × 0.2°, 2 sheets (X type) | 1 | 40 | 0.15 | Excellent |
| Example 2 | Cross-type | Anisotropic 60° × 1°, 2 sheets (X type) | 3 | 61 | 0.11 | Excellent |
| Example 3 | Cross-type | Anisotropic 30° × 5°, 2 sheets (X type) | 9 | 34 | 0.17 | Good |
| Comparative Example 1 | Conventional type | Not used | — | — | 0.50 | Excellent |
| Comparative Example 2 | Conventional type | Anisotropic 40° × 0.2°, 2 sheets (X type) | 1 | 40 | 0.24 | Excellent |
| Comparative Example 3 | Cross-type | Isotropic 40° | 40 | 40 | 0.14 | Poor |
| Comparative Example 4 | Cross type | Anisotropic 60° × 10°, 2 sheets | 37 | 37 | 0.12 | Poor |
| Comparative Example 5 | Cross-type | Anisotropic 40° × 0.2°, 2 sheets (Cross type) | 40 | 1 | 0.48 | Poor |

(Measurement Method of FWHM of Diffusion Element)

Based on the angular dependence of the transmittance, the FWHMs in directions at azimuths of 0° and 90° of each diffusion element were calculated, and the average thereof was taken as the FWHM in the cross direction. Similarly, based on the angular dependence of the transmittance, the FWHMs in directions at azimuths of 45° and 135° of each diffusion element were calculated, and the average thereof was taken as the FWHM in the X direction. The measurement device used was a goniophotometer (product name: GP200) available from MURAKAMI COLOR RESEARCH LABORATORY.

(Measurement Method of Gamma Shift Amount of Liquid Crystal Display Device)

At the gray levels 128 and 255 of the liquid crystal display device, the luminance at azimuths of 45° and 135° (polar angle of 60°) was measured, and thereby the gamma shift amounts at azimuths of 45° and 135° were calculated. The average thereof was taken as the gamma shift amount. The measurement device used was EZ-contrast 160 available from ELDIM.

(Evaluation Method of Degree of Image Blur of Liquid Crystal Display Device)

The degree of image blur was subjectively evaluated and classified into three grades including Excellent (not at all bothered by image blur), Good (not bothered by image blur), and Poor (bothered by image blur).

In each of the liquid crystal display devices of the Examples 1 to 3 according to the present invention, the gamma shift was reduced and the viewer was not bothered by image blur in comparison with the liquid crystal display devices of the Comparative Example 1 and the Comparative Example 2. In each of the liquid crystal display devices of the Comparative Example 3 and the Comparative Example 4, the gamma shift was reduced but the viewer was bothered by image blur in comparison with the liquid crystal devices of the Comparative Examples 1 and the Comparative Example 2. In the Comparative Example 4, two sheets of anisotropic diffusion films LSD 60°×10° were laminated as the diffusion element 1221. This configuration resulted in production of an isotropic diffusion element. In other words, the FWHM in the cross direction and the FWHM in the X direction were the same. In the liquid crystal display device of the Comparative Example 5, a cross-type anisotropic collimating backlight was combined with a cross-type anisotropic diffusion element. Such a configuration did not give an improvement in the gamma shift as achieved in the Example 1. Moreover, image blur and a low display luminance in the X direction were observed.

REFERENCE SIGNS LIST

10, 410, 510, 610, 1010, 1110, 1210, 1310: Liquid crystal display device
11: Backlight unit
12: Reflective polarizer
13*a*, 13*b*, 13*c*: TAC (triacetylcellulose) film
14*a*, 14*b*, 14*c*: Polarizer
15*a*, 15*b*, 15*c*, 15*d*, 23: Birefringent layer
16: Liquid crystal panel
17*a*, 17*b*, 417*a*, 417*b*, 517*a*, 517*b*, 1117, 1217*a*, 1217*b*, 1317*a*, 1317*b*: Diffusion layer
18: Anisotropic collimating element
19: Lower polarizing plate
20: Upper polarizing plate
21, 421, 521, 1121, 1221, 1321: Diffusion element

The invention claimed is:

1. A liquid crystal display device at least comprising:
an anisotropic collimating backlight;
a lower polarizing plate;
a liquid crystal panel;
an upper polarizing plate; and
an anisotropic diffusion element,
the anisotropic collimating backlight including a backlight unit and an anisotropic collimating element,
the anisotropic collimating element including a first polarizer and a birefringent layer,
the lower polarizing plate including a second polarizer and a first birefringent layer,
the upper polarizing plate including a second birefringent layer and a third polarizer,
the anisotropic diffusion element including a first diffusion layer and a second diffusion layer,
the backlight unit, the first polarizer, the birefringent layer, the second polarizer, the first birefringent layer, the liquid crystal panel, the second birefringent layer, the third polarizer, the first diffusion layer, and the second diffusion layer being laminated in the stated order,
the anisotropic collimating backlight having a greater average luminance in a direction along an absorption axis of the second polarizer and an absorption axis of the third polarizer than in a direction across the absorption axis of the second polarizer and the absorption axis of the third polarizer, and
the anisotropic diffusion element having a smaller diffusion degree in a direction along the absorption axis of the second polarizer and the absorption axis of the third polarizer than in a direction across the absorption axis of the second polarizer and the absorption axis of the third polarizer.

2. The liquid crystal display device according to claim 1, wherein, provided that an azimuth angle is determined as an counterclockwise angle relative to a predetermined direction set to 0° in a display surface of the liquid crystal display device, the anisotropic collimating backlight has a greater average luminance at the azimuth angles of substantially 0°, substantially 90°, substantially 180°, and substantially 270° than at the azimuth angles of substantially 45°, substantially 135°, substantially 225°, and substantially 315°; the anisotropic diffusion element has a smaller diffusion degree at the azimuth angles of substantially 0°, substantially 90°, substantially 180°, and substantially 270° than at the azimuth angles of substantially 45°, substantially 135°, substantially 225°, and substantially 315°; and one of the absorption axis of the second polarizer and the absorption axis of the third polarizer is at substantially 0°, and the other is at substantially 90°, or
the anisotropic collimating backlight has a smaller average luminance at the azimuth angles of substantially 0°, substantially 90°, substantially 180°, and substantially 270° than at the azimuth angles of substantially 45°, substantially 135°, substantially 225°, and substantially 315°; the anisotropic diffusion element has a greater diffusion degree at the azimuth angles of substantially 0°, substantially 90°, substantially 180°, and substantially 270° than at the azimuth angles of substantially 45°, substantially 135°, substantially 225°, and substantially 315°; and one of the absorption axis of the second polarizer and the absorption axis of the third polarizer is at substantially 45°, and the other is at substantially 135°.

3. The liquid crystal display device according to claim 2, wherein the predetermined direction in the display surface of the liquid crystal display device is in parallel with a short side direction of a pixel in the liquid crystal panel.

4. The liquid crystal display device according to claim 1, wherein an absorption axis of the first polarizer and the absorption axis of the second polarizer are in parallel with each other, and the absorption axis of the second polarizer and an in-plane slow axis of the birefringent layer are orthogonal to each other.

5. The liquid crystal display device according to claim 1, wherein a diffusion axis of the first diffusion layer and a diffusion axis of the second diffusion layer are orthogonal to each other.

6. The liquid crystal display device according to claim 1, wherein an angle between the absorption axis of the second polarizer and a diffusion axis of the first diffusion layer and an angle between the absorption axis of the second polarizer and a diffusion axis of the second diffusion layer are individually 45° or 135°.

7. The liquid crystal display device according to claim 1, wherein the anisotropic collimating element includes a plurality of the birefringent layers, and
the backlight unit, the first polarizer, the plurality of the birefringent layers, the second polarizer, the first birefringent layer, the liquid crystal panel, the second birefringent layer, the third polarizer, the first diffusion layer, and the second diffusion layer are laminated in the stated order.

8. The liquid crystal display device according to claim 7, wherein in-plane slow axes of the plurality of the birefringent layers are orthogonal to or in parallel with one another.

9. The liquid crystal display device according to claim 1, wherein the birefringent layer has a biaxial parameter NZ satisfying 10≤NZ or NZ≤−9, and
the birefringent layer has a thickness retardation value in an absolute value |Rth| satisfying |Rth|≥200 nm.

10. The liquid crystal display device according to claim 1, wherein at least one of the first polarizer and the second polarizer is a reflective polarizer or a composite polarizer including a laminate of an absorptive polarizer and a reflective polarizer.

11. The liquid crystal display device according to claim 1, wherein the first polarizer and the second polarizer are individually an absorptive polarizer or a composite polarizer including a laminate of an absorptive polarizer and a reflective polarizer, and
the first polarizer has a single transmittance different from a single transmittance of the second polarizer.

12. The liquid crystal display device according to claim 1, wherein the birefringent layer has a biaxial parameter NZ satisfying 2≤NZ<10 or −9<NZ≤−1, and
an angle between the absorption axis of the second polarizer and an in-plane slow axis of the birefringent layer is neither 45° nor 135°.

13. The liquid crystal display device according to claim 12, wherein an angle between the absorption axis of the second polarizer and the in-plane slow axis of the birefringent layer is 70° to 110° or −20° to 20°.

14. The liquid crystal display device according to claim 12, wherein at least one of the first polarizer and the second polarizer is a reflective polarizer or a composite polarizer including a laminate of an absorptive polarizer and a reflective polarizer.

15. The liquid crystal display device according to claim 12, wherein the first polarizer and the second polarizer are individually an absorptive polarizer or a composite polarizer including a laminate of an absorptive polarizer and a reflective polarizer, and
the first polarizer has a single transmittance different from a single transmittance of the second polarizer.

16. The liquid crystal display device according to claim 12, wherein the birefringent layer has a thickness retardation value in an absolute value |Rth| satisfying |Rth|≥200 nm.

* * * * *